US012812656B2

(12) United States Patent
Matsumura et al.

(10) Patent No.: US 12,812,656 B2
(45) Date of Patent: Nov. 24, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 372 days.

(21) Appl. No.: 18/043,457

(22) PCT Filed: Sep. 1, 2020

(86) PCT No.: PCT/JP2020/033095

§ 371 (c)(1),
(2) Date: Feb. 28, 2023

(87) PCT Pub. No.: WO2022/049634

PCT Pub. Date: Mar. 10, 2022

(65) Prior Publication Data

US 2024/0032060 A1 Jan. 25, 2024

(51) Int. Cl.
*H04W 72/232* (2023.01)
*H04W 72/0446* (2023.01)
*H04W 76/20* (2018.01)

(52) U.S. Cl.
CPC ..... *H04W 72/232* (2023.01); *H04W 72/0446* (2013.01); *H04W 76/20* (2018.02)

(58) Field of Classification Search
None
See application file for complete search history.

(56) References Cited

U.S. PATENT DOCUMENTS

| | | | | |
|---|---|---|---|---|
| 2017/0302341 | A1 | 10/2017 | Yu et al. | |
| 2020/0007296 | A1* | 1/2020 | Papasakellariou | H04L 5/0042 |
| 2020/0045569 | A1* | 2/2020 | Seo | H04W 72/23 |
| 2020/0107352 | A1* | 4/2020 | Tsai | H04B 7/0691 |
| 2020/0120644 | A1* | 4/2020 | Zhou | H04B 7/0617 |
| 2021/0092729 | A1* | 3/2021 | Ryu | H04W 8/22 |
| 2022/0116177 | A1* | 4/2022 | Shi | H04L 5/0055 |
| 2022/0225370 | A1* | 7/2022 | Park | H04W 72/23 |
| 2022/0304038 | A1* | 9/2022 | Zhang | H04B 7/088 |
| 2022/0312456 | A1* | 9/2022 | Guo | H04L 5/0053 |
| 2022/0393831 | A1* | 12/2022 | Zhang | H04L 5/0044 |
| 2023/0122786 | A1* | 4/2023 | Bang | H04W 72/232 370/329 |

OTHER PUBLICATIONS

US Provisional 62949646 (Year: 2019).*
(Continued)

*Primary Examiner* — Andre Tacdiran
(74) *Attorney, Agent, or Firm* — Osha Bergman Watanabe & Burton LLP

(57) ABSTRACT

A terminal according to an aspect of the present disclosure includes a receiving section configured to receive downlink control information (DCI) indicating a transmission configuration indication (TCI) state applicable to downlink and uplink, and a control section configured to apply the TCI state at a timing based on the DCI. According to one aspect of the present disclosure, information on QCL can be appropriately determined.

4 Claims, 17 Drawing Sheets

(56) References Cited

OTHER PUBLICATIONS

Office Action issued in Chinese Application No. 202080106430.5, mailed Jan. 23, 2025 (13 pages).
Office Action issued in Japanese Patent Application No. 2022-546749, dated Oct. 29, 2024 (7 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
3GPP TSG RAN WG1 Meeting #102-e; R1-2005454 "Enhancements on Multi-beam Operation" ZTE; e-Meeting, Aug. 17-28, 2020 (12 pages).
3GPP TSG RAN WG1 #101-e; R1-2003987 "Discussion on remaining issues for multi-TRP operation" Spreadtrum Communications; e-Meeting; May 25-Jun. 5, 2020 (7 pages).
3GPP TSG RAN WG1 Meeting #98bis; R1-1910074 "Enhancements on multi-beam operation" Huawei, HiSilicon; Chongqing, China; Oct. 14-20, 2019 (19 pages).
International Search Report issued in International Application No. PCT/JP2020/033095, mailed Apr. 20, 2021 (3 pages).
Written Opinion issued in International Application No. PCT/JP2020/033095; Dated Apr. 20, 2021 (4 pages).
Office Action issued in Chinese Patent Application No. 202080106430.5, mailed on Jun. 27, 2025 (14 pages).
Office Action issued in Japanese Application No. 2022-546749, mailed Apr. 1, 2025 (6 pages).
OPPO: "Discussion on Rel-16 eMIMO UE features"; 3GPP TSG RAN WG1 #100bis, R1-2001738; e-Meeting, Apr. 20-30, 2020 (9 pages).

* cited by examiner

COMMON ACTIVE TCI STATE

| TCI field | active TCI state |
|---|---|
| 000 | no update |
| 001 | TCI state #1 |
| 010 | TCI state #2 |
| 011 | TCI state #3 |
| 100 | TCI state #4 |
| 101 | TCI state #5 |
| 110 | TCI state #6 |
| 111 | TCI state #7 |

000 → MAINTAIN COMMON BEAM

001–111 → UPDATE COMMON BEAM

FIG. 13

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low delay, and the like (Non Patent Literature 1). In addition, for the purpose of further increasing capacity and advancement of LTE (third generation partnership project (3GPP) release (Rel.) 8 and 9), the specifications of LTE-Advanced (3GPP Rel. 10 to 14) have been drafted.

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In a future radio communication system (for example, NR), it has been studied that a user terminal (terminal, user equipment (UE)) controls transmission/reception processing based on information on quasi-co-location (QCL) (QCL assumption/transmission configuration indication (TCI) state/spatial relation).

However, there is a case where information on the QCL is not clear. When the information on the QCL is not clear, there is a possibility of causing deterioration in communication quality, deterioration in throughput, and the like.

Therefore, an object of the present disclosure is to provide a terminal, a radio communication method, and a base station capable of appropriately determining the information on QCL.

Solution to Problem

A terminal according to an aspect of the present disclosure includes a receiving section configured to receive downlink control information (DCI) indicating a transmission configuration indication (TCI) state applicable to downlink and uplink, and a control section configured to apply the TCI state at a timing based on the DCI.

Advantageous Effects of Invention

According to one aspect of the present disclosure, information on QCL can be appropriately determined.

BRIEF DESCRIPTION OF DRAWINGS

FIG. 13 is a diagram illustrating an example of association between a code point of a TCI field and an active TCI state according to a sixth embodiment.

Figure 1:
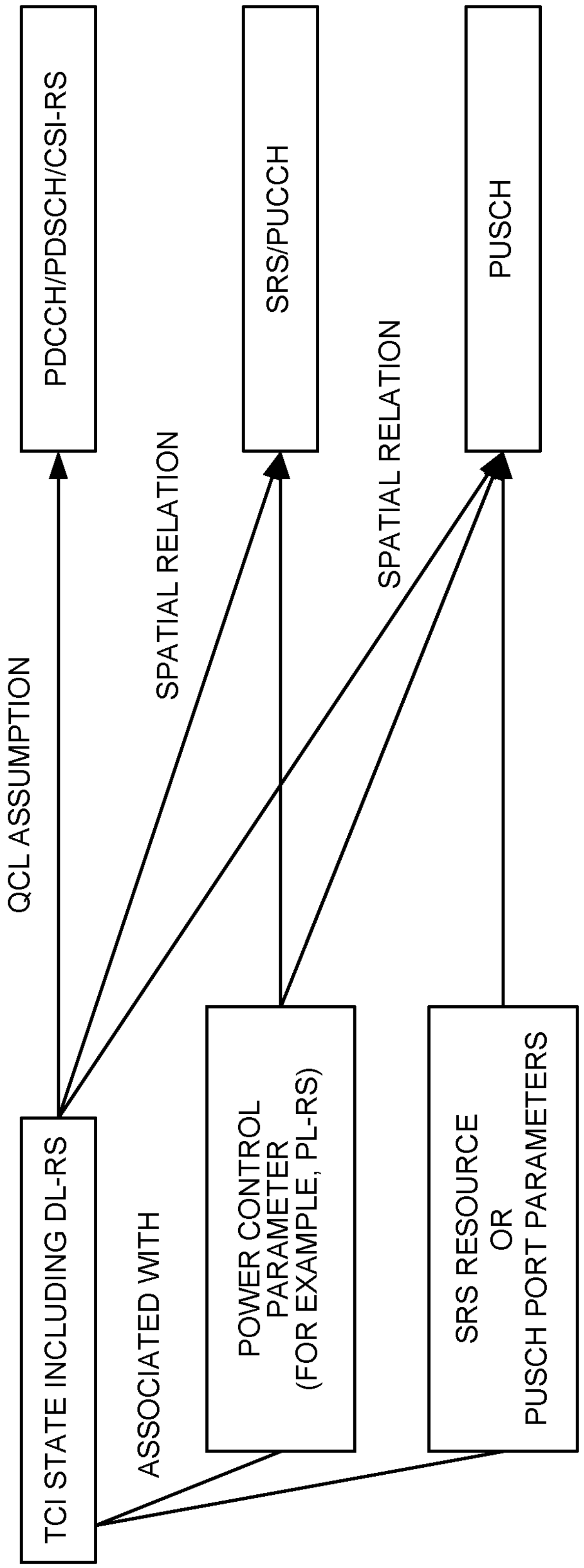
FIG. 1 is a diagram illustrating an example of a unified TCI framework.

DESCRIPTION OF EMBODIMENTS (TCI, Spatial Relation, and QCL)

In NR, it has been studied to control reception processing (for example, at least one of reception, demapping, demodulation, and decoding) and transmission processing (for example, at least one of transmission, mapping, precoding, modulation, and coding) of at least one of a signal and a channel (expressed as a signal/channel) in UE based on a transmission configuration indication state (TCI state).

The TCI state may represent what is applied to a downlink signal/channel. Those corresponding to the TCI state applied to an uplink signal/channel may be expressed as a spatial relation.

The TCI state is information on a quasi-co-location (QCL) of the signal/channel, and may also be referred to as, for example, a spatial Rx parameter, spatial relation information, or the like. The TCI state may be configured in the UE for each channel or each signal.

The QCL is an indicator indicating a statistical property of a signal/channel. For example, when one signal/channel and another signal/channel have a QCL relation, this may mean that it is possible to assume that at least one of Doppler shift, Doppler spread, an average delay, a delay spread, and a spatial parameter (for example, a spatial Rx parameter) is identical (in QCL with respect to at least one of these) between the plurality of different signals/channels.

It is noted that the spatial Rx parameter may correspond to a reception beam of the UE (for example, a reception analog beam), and the beam may be specified based on spatial QCL. The QCL (or at least one element of the QCL) in the present disclosure may be replaced with spatial QCL (sQCL).

A plurality of types of QCL (QCL types) may be defined. For example, four QCL types A to D with different parameters (or parameter sets) that can be assumed to be identical may be provided, and these parameters (which may be referred to as QCL parameters) are described as follows:

QCL type A (QCL-A): Doppler shift, Doppler spread, average delay, and delay spread;

QCL type B (QCL-B): Doppler shift and Doppler spread;

QCL type C (QCL-C): Doppler shift and average delay; and

QCL type D (QCL-D): spatial Rx parameter.

It may be referred to as a QCL assumption for the UE to assume that a certain control resource set (CORESET), channel, or reference signal has a specific QCL (for example, QCL type D) relation with another CORESET, channel, or reference signal.

The UE may determine at least one of a transmission beam (Tx beam) and a reception beam (Rx beam) of a signal/channel based on a TCI state of the signal/channel or the QCL assumption.

The TCI state may be, for example, information on the QCL of a target channel (in other words, a reference signal (RS) for the channel) and another signal (for example, another RS). The TCI state may be configured (indicated) by higher layer signaling, physical layer signaling, or a combination thereof.

The physical layer signaling may be, for example, downlink control information (DCI).

A channel for which a TCI state or spatial relation is configured (specified) may be, for example, at least one of a physical downlink shared channel (PDSCH), a physical downlink control channel (PDCCH), a physical uplink shared channel (PUSCH), and a physical uplink control channel (PUCCH).

In addition, an RS having a QCL relation with the channel may be, for example, at least one of a synchronization signal block (SSB), a channel state information reference signal (CSI-RS), a sounding reference signal (SRS), a tracking CSI-RS (also referred to as a tracking reference signal (TRS)), and a QCL detection reference signal (also referred to as a QRS).

The SSB is a signal block including at least one of a primary synchronization signal (PSS), a secondary synchronization signal (SSS), and a physical broadcast channel (PBCH). The SSB may be referred to as an SS/PBCH block.

An RS of QCL type X in a TCI state may mean an RS in a QCL type X relation with (DMRS of) a certain channel/signal, and this RS may be referred to as a QCL source of QCL type X in the TCI state.

(Path-Loss RS)

The Path-loss $PL_{b,f,c}$ ($q_d$) [dB] in transmission power control of each of the PUSCH, the PUCCH, and the SRS is calculated by the UE using an index $q_d$ of a reference signal (an RS, or a Path-loss reference RS (PathlossReferenceRS)) for a downlink BWP associated with an active UL BWP b of a carrier f of a serving cell c. In the present disclosure, the Path-loss reference RS, the Path-loss (PL)-RS, the index $q_d$, the RS used for Path-loss calculation, and an RS resource used for Path-loss calculation may be replaced with each other. In the present disclosure, calculation, estimation, measurement, and tracking may be replaced with each other.

Studies are being made on whether to change the existing mechanism of higher layer filtered RSRP for Path-loss measurement when the Path-loss RS is updated by an MAC CE.

When the Path-loss RS is updated by the MAC CE, Path-loss measurement based on L1-RSRP may be applied. At available timing after the MAC CE for updating the Path-loss RS, higher layer filtered RSRP may be used for the Path-loss measurement, and before the higher layer filtered RSRP is applied, the L1-RSRP may be used for the Path-loss measurement. At available timing after the MAC CE for updating the Path-loss RS, higher layer filtered RSRP may be used for the Path-loss measurement, and before the above-mentioned timing, the higher layer filtered RSRP of the previous Path-loss RS may be used. Similar to the operation of Rel. 15, the higher layer filtered RSRP may be used for the Path-loss measurement, and the UE may track all Path-loss RS candidates configured by the RRC. The maximum number of Path-loss RSs that can be configured by the RRC may depend on the UE capability. When the maximum number of Path-loss RSs that can be configured by the RRC is X, X or less Path-loss RS candidates may be configured by the RRC, and a Path-loss RS may be selected by the MAC CE from among the configured Path-loss RS candidates. The maximum number of Path-loss RSs that can be configured by the RRC may be 4, 8, 16, 64, or the like.

In the present disclosure, higher layer filtered RSRP, filtered RSRP, and layer 3 filtered RSRP may be replaced with each other.

(Default TCI State/Default Spatial Relation/Default PL-RS)

In an RRC connection mode, both in a case where in-DCI TCI information (higher layer parameter TCI-PresentInDCI) is set to “enabled” and in a case where no in-DCI TCI information is configured, if the time offset between the reception of DL DCI (DCI that schedules a PDSCH) and the corresponding PDSCH (the PDSCH scheduled by the DCI) is smaller than a threshold (timeDurationForQCL) (application condition: a first condition), in the case of non-cross-carrier scheduling, the TCI state (a default TCI state) of the PDSCH may be the TCI state of the lowest CORESET ID in the newest slot in an active DL BWP of the CC (of a specific UL signal). Otherwise, the TCI state (a default TCI state) of a PDSCH may be the TCI state of the lowest TCI state ID of PDSCHs in an active DL BWP of a CC where scheduling is made.

In Rel. 15, individual MAC CEs of an MAC CE for activation/deactivation of a PUCCH spatial relation and an MAC CE for activation/deactivation of an SRS spatial relation are needed. The PUSCH spatial relation conforms to the SRS spatial relation.

In Rel. 16, at least one of an MAC CE for activation/deactivation of a PUCCH spatial relation and an MAC CE for activation/deactivation of an SRS spatial relation may not be used.

When, in FR2, neither a spatial relation nor a PL-RS for a PUCCH is configured (application condition: a second condition), default assumptions of the spatial relation and the PL-RS (a default spatial relation and a default PL-RS) are applied to the PUCCH. When, in FR2, neither a spatial relation nor a PL-RS for an SRS (an SRS resource for an SRS, or an SRS resource corresponding to an SRI in DCI format 0_1 that schedules a PUSCH) is configured (application condition: the second condition), default assumptions of the spatial relation and the PL-RS (a default spatial relation and a default PL-RS) are applied to the PUSCH scheduled by DCI format 0_1 and the SRS.

When the CORESET is configured in the active DL BWP on the CC (application condition), the default spatial relation and the default PL-RS may be the TCI state or the QCL assumption of the CORESET having the lowest CORESET ID in the active DL BWP. When the CORESET is not configured in the active DL BWP on the CC, the default spatial relation and the default PL-RS may be in the active TCI state having the lowest ID of the PDSCH in the active DL BWP.

In Rel. 15, the spatial relation of a PUSCH scheduled by DCI format 0_0 conforms to the spatial relation of the PUCCH resource having the lowest PUCCH resource ID among active spatial relations of PUCCHs on the same CC. Even when no PUCCHs are transmitted on SCells, the network needs to update the PUCCH spatial relations on all SCells.

In Rel. 16, a PUCCH configuration for a PUSCH scheduled by DCI format 0_0 is not required. When, for a PUSCH scheduled by DCI format 0_0, there is no active PUCCH spatial relation or no PUCCH resource on an active UL BWP in the CC (application condition: the second condition), a default spatial relation and a default PL-RS are applied to the PUSCH.

The application condition of the default spatial relation and the default PL-RS for the SRS may include the fact that a default beam path-loss activation information element for the SRS (higher layer parameter enableDefaultBeamPlForSRS) is set to be enabled. The application condition of the default spatial relation and the default PL-RS for the PUCCH may include the fact that a default beam path-loss activation information element for the PUCCH (higher layer parameter enableDefaultBeamPlForPUCCH) is set to be enabled. The application condition of the default spatial relation and the default PL-RS for the PUSCH scheduled by the DCI format 0_0 may include the fact that a default beam path-loss activation information element for the PUSCH (higher layer parameter enableDefaultBeamPlForPUSCH0_0) scheduled by the DCI format 0_0 is set to be enabled.

Further, the above-mentioned threshold may be referred to as QCL time duration "time Duration For QCL", "threshold", "threshold for offset between a DCI indicating a TCI state and PDSCH scheduled by the DCI", "threshold-Sched-Offset", a schedule offset threshold, a scheduling offset threshold, or the like.

(Multi-TRPs)

In NR, studies are underway to allow one or more transmission/reception points (TRPs) (multi-TRPs (MTRPs)) to perform DL transmission to the UE by using one or more panels (multi-panels). In addition, studies are underway to allow the UE to perform UL transmission to one or more TRPs by using one or more panels.

It is noted that the plurality of TRPs may correspond to the same cell identifier (ID), or may correspond to different cell IDs. The cell ID may be a physical cell ID or a virtual cell ID.

The multi-TRPs (for example, TRPs #1 and #2) are connected by an ideal/non-ideal backhaul, and information, data, and the like may be exchanged. A different codeword (CW) and a different layer may be transmitted from each TRP of the multi-TRPs. Non-coherent joint transmission (NCJT) may be used as one form of multi-TRP transmission.

In the NCJT, for example, TRP #1 performs modulation mapping and layer mapping on a first codeword, uses first precoding in a first number of layers (for example, two layers), and transmits a first PDSCH. In addition, TRP #2 performs modulation mapping and layer mapping on a second codeword, uses second precoding in a second number of layers (for example, two layers), and transmits a second PDSCH.

It is noted that a plurality of PDSCHs (multi-PDSCHs) subjected to the NCJT may be defined as partially or completely overlapping regarding at least one of time domain and frequency domain. That is, the first PDSCH from a first TRP and the second PDSCH from a second TRP may overlap each other in at least one of time resource and frequency resource.

The first PDSCH and the second PDSCH may be assumed not to be in a quasi-co-location (QCL) relation (not quasi-co-located). Reception of the multi-PDSCHs may be replaced with simultaneous reception of PDSCHs that are not of a certain QCL type (for example, QCL type D).

A plurality of PDSCHs (which may be referred to as multiple PDSCHs) from the multi-TRPs may be scheduled by using one piece of DCI (single DCI, single PDCCH) (single master mode, single-DCI-based multi-TRPs). A plurality of PDSCHs from the multi-TRPs may be scheduled by using a plurality of pieces of DCI (a plurality of DCI, multi-DCI or multiple PDSCHs) (multi-master mode, multi-DCI-based multi-TRPs).

Such a multi-TRPs scenario can perform more flexible transmission control using a high-quality channel.

In RRC configuration information for linking a plurality of pairs of PDSCHs and PDSCHs having a plurality of TRPs, one control resource set (CORESET) in PDCCH configuration information (PDCCH-Config) may correspond to one TRP, to support intra-cell (having the same cell ID) and inter-cell (having different cell IDs) multi-TRP transmission based on the plurality of PDSCHs.

(CSI)

In NR, a UE measures a channel state by using a reference signal (or a resource for the reference signal) and feeds back (reports) channel state information (CSI) to a network (for example, a base station).

The UE may measure the channel state using at least one of a channel state information reference signal (CSI-RS), a synchronization signal/physical broadcast channel (SS/PBCH) block, a synchronization signal (SS), a demodulation reference signal (DMRS), and the like.

A CSI-RS resource may include at least one of a Non Zero Power (NZP) CSI-RS resource, a Zero Power (ZP) CSI-RS resource, and a CSI Interference Measurement (CSI-IM) resource.

A resource for measuring a signal component for CSI may be referred to as a signal measurement resource (SMR) or a channel measurement resource (CMR). The SMR (CMR) may include, for example, an NZP CSI-RS resource for channel measurement, an SSB, and the like.

A resource for measuring an interference component for CSI may be referred to as an Interference Measurement Resource (IMR). The IMR may include, for example, at least one of the NZP CSI-RS resource for interference measurement, an SSB, a ZP CSI-RS resource, and a CSI-IM resource.

The SS/PBCH block is a block including a synchronization signal (for example, primary synchronization signal (PSS) and secondary synchronization signal (SSS)) and a PBCH (and the corresponding DMRS), which may be referred to as an SS block (SSB) or the like.

It is noted that, the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), reference signal received power in layer 1 (L1-RSRP), L1-reference signal received quality (L1-RSRQ), an L1-signal to interference plus noise ratio (L1-SINR), an L1-signal to noise ratio (L1-SNR), and the like.

The CSI may include a plurality of parts. A CSI part 1 may include information with a relatively small number of bits (for example, the RI). A CSI part 2 may include information with a relatively large number of bits (for example, the CQI) such as information determined based on the CSI part 1.

Furthermore, the CSI may also be classified into several CSI types. The type and size of information to be reported may be different depending on the CSI type. For example, a CSI type configured for performing communication using a single beam (also referred to as type 1 (type I) CSI, CSI for a single beam, or the like), and a CSI type configured for performing communication using multiple beams (also referred to as type 2 (type II) CSI, CSI for multiple beams, or the like) may be specified. The usage of the CSI type is not limited thereto.

As a CSI feedback method, periodic CSI (periodic CSI (P-CSI)) report, aperiodic CSI (Aperiodic CSI (A-CSI, AP-CSI)) report, semi-persistent CSI (semi-persistent CSI (SP-CSI)) report, and the like have been studied.

The UE may be notified of CSI measurement configuration information using higher layer signaling, physical layer signaling, or a combination thereof.

In the present disclosure, the higher layer signaling may be any of, for example, radio resource control (RRC) signaling, medium access control (MAC) signaling, broadcast information, and the like, or a combination thereof.

For example, a MAC control element (MAC CE), a MAC protocol data unit (PDU), or the like may be used for the MAC signaling. The broadcast information may be, for example, a master information block (MIB), a system information block (SIB), remaining minimum system information (RMSI), other system information (OSI), or the like.

The physical layer signaling may be, for example, downlink control information (DCI).

The CSI measurement configuration information may be configured using, for example, the RRC information element "CSI-MeasConfig". The CSI measurement configuration information may include CSI resource configuration information (RRC information element "CSI-ResourceConfig"), CSI report configuration information (RRC information element "CSI-ReportConfig"), and the like. The CSI resource configuration information is related to a resource for CSI measurement, and the CSI report configuration information is related to how the UE performs CSI reporting.

A description will be given as to the RRC information element (or the RRC parameter) concerning the CSI report configuration and the CSI resource configuration.

The CSI report configuration information ("CSI-ReportConfig") includes channel measurement resource information ("resourcesForChannelMeasurement"). Furthermore, the CSI report configuration information may include resource information for interference measurement (for example, NZP CSI-RS resource information for interference measurement ("nzp-CSI-RS-ResourcesForinterference"), CSI-IM resource information for interference measurement ("csi-IM-ResourcesForinterference"), and the like. These pieces of resource information (these resource information) correspond to CSI resource configuration information IDs (Identifiers) ("CSI-ResourceConfigId").

It is noted that, the CSI resource configuration information IDs (which may be referred to as CSI resource configuration IDs) corresponding to respective pieces of resource information (respective resource information) may have the same value in one or more IDs or may respectively have different values.

The CSI resource configuration information ("CSI-ResourceConfig") may include a CSI resource configuration information ID, CSI-RS resource set list information ("csi-RS-ResourceSetList"), a resource type ("resourceType"), and the like. The CSI-RS resource set list may include at least one of NZP CSI-RS and SSB information ("nzp-CSI-RS-SSB") for measurement and CSI-IM resource set list information ("csi-IM-ResourceSetList").

The resource type represents a behavior of a time domain of this resource configuration, and "aperiodic", "semi-persistent", and "periodic" can be configured. For example, the corresponding CSI-RS may be referred to as A-CSI-RS (AP-CSI-RS), SP-CSI-RS, or P-CSI-RS.

It is noted that, a resource for channel measurement may be used for calculation of, for example, the CQI, PMI, L1-RSRP, and the like. Furthermore, a resource for interference measurement may be used for calculation of the L1-SINR, L1-SNR, L1-RSRQ, and other indicators regarding interference.

(Unified TCI Framework)

It is considered to use the same TCI state for both UL and DL channels.

In the example of FIG. 1, the TCI state including the DL-RS is used for the QCL assumption of PDCCH/PDSCH/CSI-RS, the spatial relation of SRS/PUCCH, and the spatial relation of PUSCH.

It has been studied that RRC/MAC-CE/DCI is used to select one TCI state for UL/DL.

Figure 2:
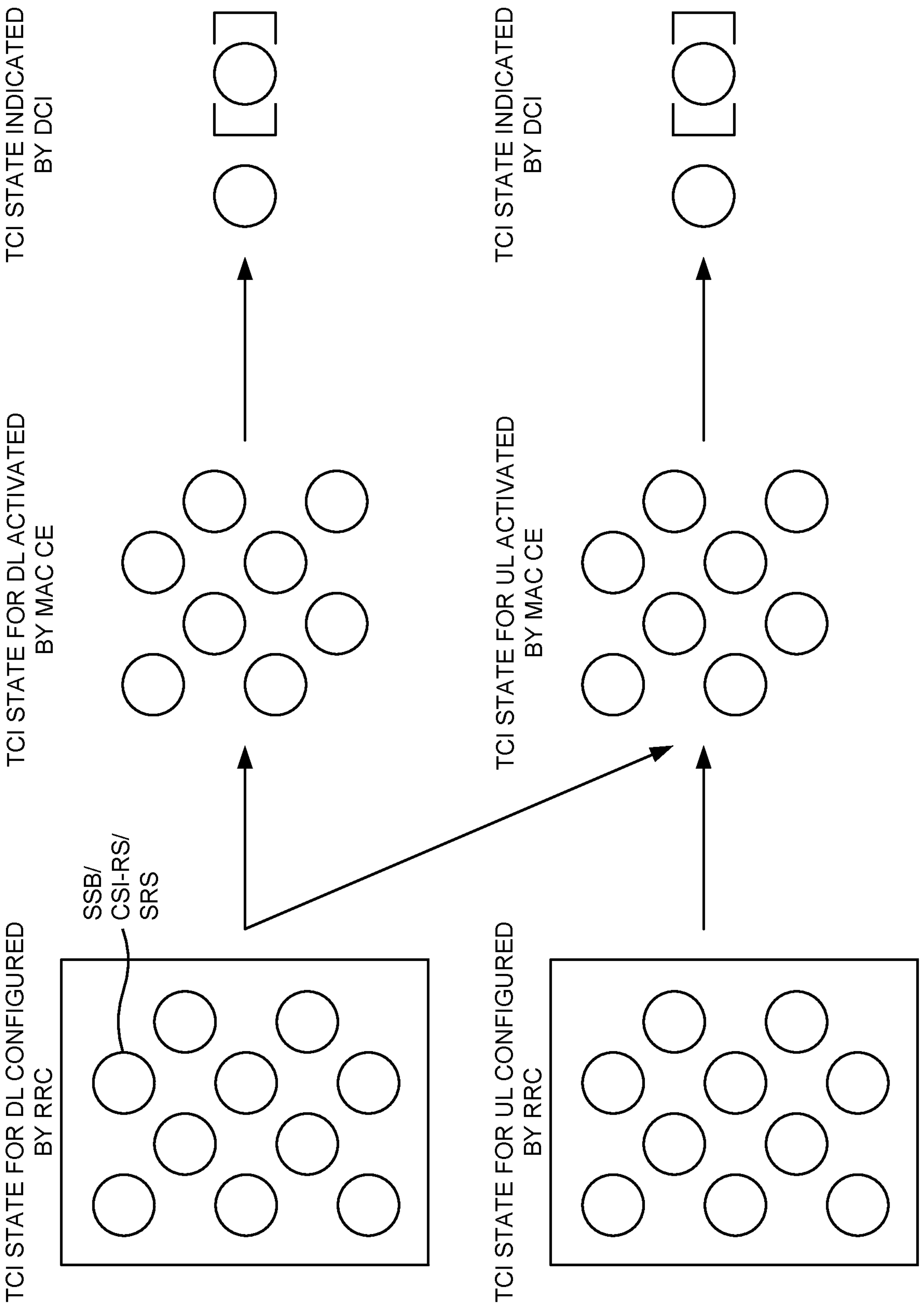
FIG. 2 is a diagram illustrating an example of a method of notifying a unified TCI state.

In the example of FIG. 2, a plurality of unified TCI states for the DL are configured by the RRC, and a plurality of unified TCI states for the UL are configured by the RRC. Each of the plurality of unified TCI states for the DL and the plurality of unified TCI states for the UL may be SSB, CSI-RS, or SRS.

A part of the unified TCI state for the DL configured by the RRC is activated as the unified TCI state for the DL by the MAC CE. A part of the unified TCI state for the DL configured by the RRC is activated as the unified TCI state for the UL by the MAC CE. A part of the unified TCI state for the UL configured by the RRC is activated as the unified TCI state for the UL by the MAC CE. A part of the unified TCI state for the DL activated by the MAC CE is indicated by the DCI. A part of the unified TCI state for the UL activated by the MAC CE is indicated by the DCI.

According to a unified TCI framework, the UL and DL channels can be controlled by a common framework. The unified TCI framework may not define the TCI state or the spatial relation for each channel as in Rel. 15, but may indicate a common beam and apply the same to all the UL and DL channels, or a common beam for the UL may be applied to all the UL channels and a common beam for the DL may be applied to all the DL channels.

However, the timing at which the TCI state is applied is not clear. If the timing is not clear, discrepancy may occur between the UE and the base station, which may cause deterioration in communication quality, deterioration in throughput, and the like.

Therefore, the present inventors have conceived a method of determining the TCI state.

Hereinafter, embodiments according to the present disclosure will be described in detail with reference to the drawings. The radio communication method according to each of the embodiments may be applied independently, or may be applied in combination with others.

In the present disclosure, "A/B/C" and "at least one of A, B and C" may be replaced with each other. In the present disclosure, the cell, the CC, the carrier, the BWP, the DL BWP, the UL BWP, the active DL BWP, the active UL BWP, and the band may be replaced with each other. In the present disclosure, an index, an ID, an indicator, and a resource ID may be replaced with each other. In the present disclosure, support, control, controllable, operate, and operable may be replaced with each other.

In the present disclosure, configure, activate, update, indicate, enable, specify, and select may be replaced with each other.

In the present disclosure, the MAC CE and the activation/deactivation command may be replaced with each other.

In the present disclosure, the higher layer signaling may be any of, for example, radio resource control (RRC) signaling, medium access control (MAC) signaling, broadcast information, and the like, or a combination thereof. In the present disclosure, the RRC, the RRC signaling, the RRC parameter, the higher layer, the higher layer parameter, the RRC information element (IE), and the RRC message may be replaced with each other.

For example, a MAC control element (MAC CE), a MAC protocol data unit (PDU), or the like may be used for the MAC signaling. The broadcast information may be, for example, a master information block (MIB), a system information block (SIB), remaining minimum system information (RMSI), other system information (OSI), or the like.

In the present disclosure, the beam, the spatial domain filter, the spatial setting, the TCI state, the UL TCI state, the unified TCI state, the unified beam, the common TCI state, the common beam, the QCL assumption, the QCL parameter, the spatial domain reception filter, the UE spatial domain reception filter, the UE reception beam, the DL beam, the DL reception beam, the DL precoding, the DL precoder, the DL-RS, the QCL type D RS of the TCI state/QCL assumption, the QCL type A RS of the TCI state/QCL assumption, the spatial relation, the spatial domain transmission filter, the UE spatial domain transmission filter, the UE transmission beam, the UL beam, the UL transmission beam, the UL precoding, the UL precoder, and the PL-RS may be replaced with each other. In the present disclosure, the QCL type X-RS, the DL-RS associated with QCL type X, the DL-RS with QCL type X, a source of the DL-RS, the SSB, the CSI-RS, and the SRS may be replaced with each other.

UL DCI, DCI for scheduling the UL channel (PUSCH), and a DCI format 0_x (x=0, 1, 2, . . . ) may be replaced with each other. DL DCI, DCI for scheduling the DL channel (PDSCH), and a DCI format 1_x (x=0, 1, 2, . . . ) may be replaced with each other.

In the present disclosure, HARQ-ACK information, ACK, and NACK may be replaced with each other.

In the present disclosure, the single TRP, the single TRP system, the single TRP transmission, and the single PDSCH may be replaced with one another. In the present disclosure, the multi-TRPs, the multi-TRP system, the multi-TRP transmission, and the multi-PDSCHs may be replaced with each other. In the present disclosure, the single DCI, the single PDCCH, the single-DCI-based multi-TRPs, and that two TCI states on at least one TCI codepoint are activated may be replaced with each other.

In the present disclosure, the single TRP, the channel using the single TRP, the channel using one TCI state/spatial relation, the fact that the multi-TRPs are not enabled by the RRC/DCI, the fact that the multiple TCI states/spatial relations are not enabled by the RRC/DCI, and the fact that a CORESET pool index (CORESETPoolIndex) value of 1 is not configured for any CORESET and no codepoint in the TCI field is mapped to two TCI states may be replaced with each other.

In the present disclosure, the multi-TRPs, the channel using multi-TRPs, the channel using a plurality of TCI states/spatial relations, the fact that the multi-TRPs are enabled by the RRC/DCI, the fact that the plurality of TCI states/spatial relations are enabled by the RRC/DCI, and at least one of the single-DCI-based multi-TRPs and the multi-DCI-based multi-TRPs may be replaced with each other. In the present disclosure, the multi-DCI-based multi-TRPs and the fact that a CORESET pool index (CORESETPoolIndex) value of 1 is configured for the CORESET may be replaced with each other. In the present disclosure, the single-DCI-based multi-TRPs and the fact that at least one codepoint of the TCI field is mapped to two TCI states may be replaced with each other.

In the present disclosure, a CSI-RS, an NZP-CSI-RS, a periodic (P)-CSI-RS, a P-TRS, a semi-persistent (SP)-CSI-RS, an aperiodic (A)-CSI-RS, a TRS, a CSI-RS having TRS information (higher layer parameter trs-Info), and an NZP CSI-RS resource in an NZP CSI-RS resource set having TRS information may be replaced with each other. In the present disclosure, a CSI-RS resource, a CSI-RS resource set, a CSI-RS resource group, and an information element (IE) may be replaced with each other.

(Radio Communication Method)

In the present disclosure, the pool, the set, the group, and the list may be replaced with each other.

In the present disclosure, the common beam, the unified TCI state, the beam applicable to the DL and the UL, the beam applied to the plurality of channels, and the PL-RS may be replaced with each other.

First Embodiment

The UE may assume the same TCI state pool for the UL and the DL.

The RRC (parameter, information element) may configure a plurality of TCI states (pools) for a UL/DL channel.

The MAC CE may select (activate) one or more (for example, a plurality of) TCI states (sets) for the UL/DL channel.

A UL/DL DCI may select (indicate) one or more (for example, one) TCI states. This TCI state may be applied to a plurality of UL/DL channels. The UL/DL channel may be PDCCH/PDSCH/PUSCH/SRS/PUCCH.

The UL/DL DCI may include a new TCI field. The UL/DL DCI may be at least one of DCI formats 0_1, 0_2, 1_1, and 1_2. The new TCI field may select at least one of the plurality of active TCI states (for example, one).

If the new TCI field exists in the DCI formats 1_1 and 1_2, the TCI field of Rel. 15/16 may not exist in the DCI formats 1_1 and 1_2.

The fact that the new TCI field exists in the DCI may be configured by a higher layer. The existence of the new DCI field in the UL DCI and the existence of the new DCI field in the DL DCI may be configured independently of each other (separately). The existence of the new DCI field in the UL DCI and the existence of the new DCI field in the DL DCI may be jointly configured.

The size (the number of bits) of the TCI field may be the same or different in the UL DCI and the DL DCI. For example, the size of the TCI field in the DL DCI may be greater than the size of the TCI field in the UL DCI.

Figure 3:
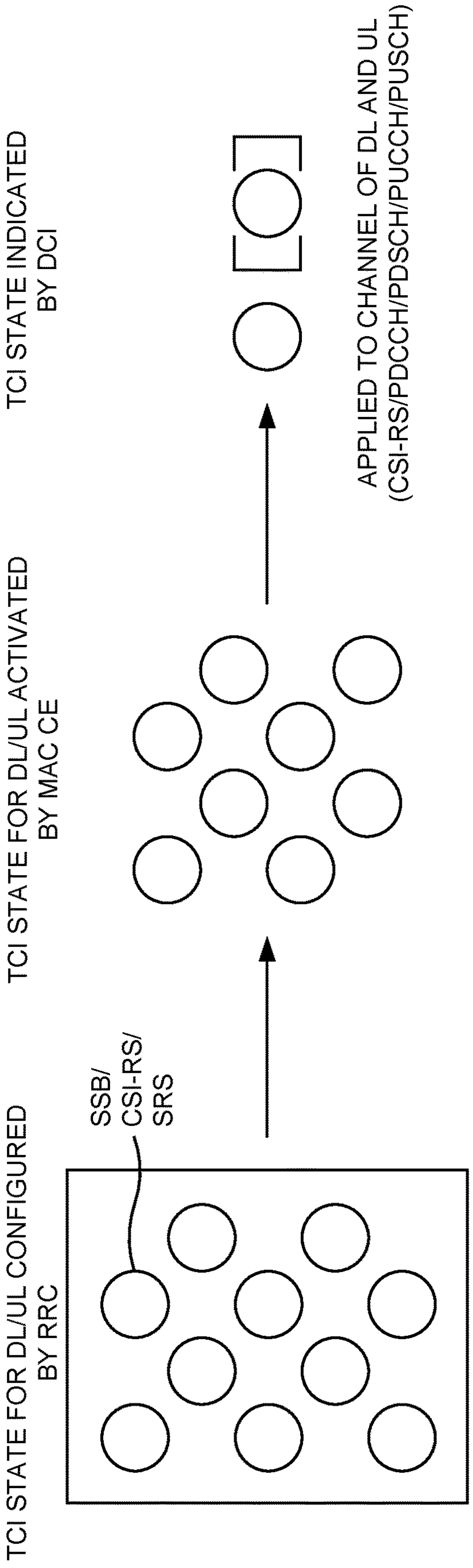
FIG. 3 is a diagram illustrating an example of a method of determining a TCI state according to a first embodiment.

In the example of FIG. 3, the RRC configures a plurality of TCI states for the DL and the UL. Each of the plurality of TCI states may be the SSB, the CSI-RS, or the SRS. The MAC CE activates a part of the plurality of configured TCI states. The DCI indicates at least one of the plurality of activated TCI states.

The indicated TCI state is applied to the plurality of UL/DL channels. The UL/DL channel may be PDCCH/PDSCH/PUSCH/SRS/PUCCH.

The UL and DL default beams may be aligned by beam management based on the MAC CE. The default TCI state of the PDSCH may be updated to match a default UL beam (spatial relation).

The beam management based on the DCI may indicate the common beam/unified TCI state from the same TCI state pool for both the UL and the DL. M (>1) TCI states may be activated by the MAC CE. The UL/DL DCI may select one from the M active TCI states. The selected TCI state may be applied to the channels/RSs of both the UL and the DL.

According to the first embodiment described above, the TCI state configured in one pool can be used for the UL and DL channels.

Second Embodiment

The UE may assume different TCI state pools for each of the UL and the DL.

The RRC (parameter, information element) may configure a plurality of TCI states (pools) for the UL/DL channel.

The MAC CE may select (activate) one or more (for example, a plurality of) TCI states (sets) for each of the UL and DL channels. The MAC CE may activate two sets of TCI states.

One MAC CE format may be defined for both the DL and the UL. One MAC CE (one transmission) may indicate two sets of TCI states. The two sets of TCI states may be for the DL and the UL, respectively. Two MAC CEs (two transmissions) may indicate a set of TCI states for the DL and a set of TCI states for the UL, respectively. Each MAC CE may include a 1-bit field indicating whether it is for the DL or the UL.

Different MAC CE formats may be defined for the DL and the UL.

The DL DCI may select (indicate) one or more (for example, one) TCI states. This TCI state may be applied to one or more DL channels. The DL channel may be PDCCH/PDSCH/CSI-RS.

The UL DCI selects (indicates) one or more (for example, one) TCI states. This TCI state may be applied to one or more UL channels. The UL channel may be PUSCH/SRS/PUCCH.

The UL/DL DCI may include a new TCI field. The UL/DL DCI may be at least one of DCI formats 0_1, 0_2, 1_1, and 1_2. The new TCI field may select at least one of the plurality of active TCI states (for example, one).

If the new TCI field exists in the DCI formats 1_1 and 1_2, the TCI field of Rel. 15/16 may not exist in the DCI formats 1_1 and 1_2. In the DCI formats 1_1 and 1_2, there may be no new TCI field. The existing TCI field may be reused for indicating the TCI state in this embodiment.

The fact that the new TCI field exists in the DCI may be configured by a higher layer. The existence of the new DCI field in the UL DCI and the existence of the new DCI field in the DL DCI may be configured independently of each other (separately). The existence of the new DCI field in the UL DCI and the existence of the new DCI field in the DL DCI may be jointly configured.

The size (the number of bits) of the TCI field may be the same or different in the UL DCI and the DL DCI. For example, the size of the TCI field in the DL DCI may be greater than the size of the TCI field in the UL DCI.

At least one of the existence and the size of the TCI field in the DCI may be determined by the number of TCI states activated by the MAC CE.

Figure 4A:
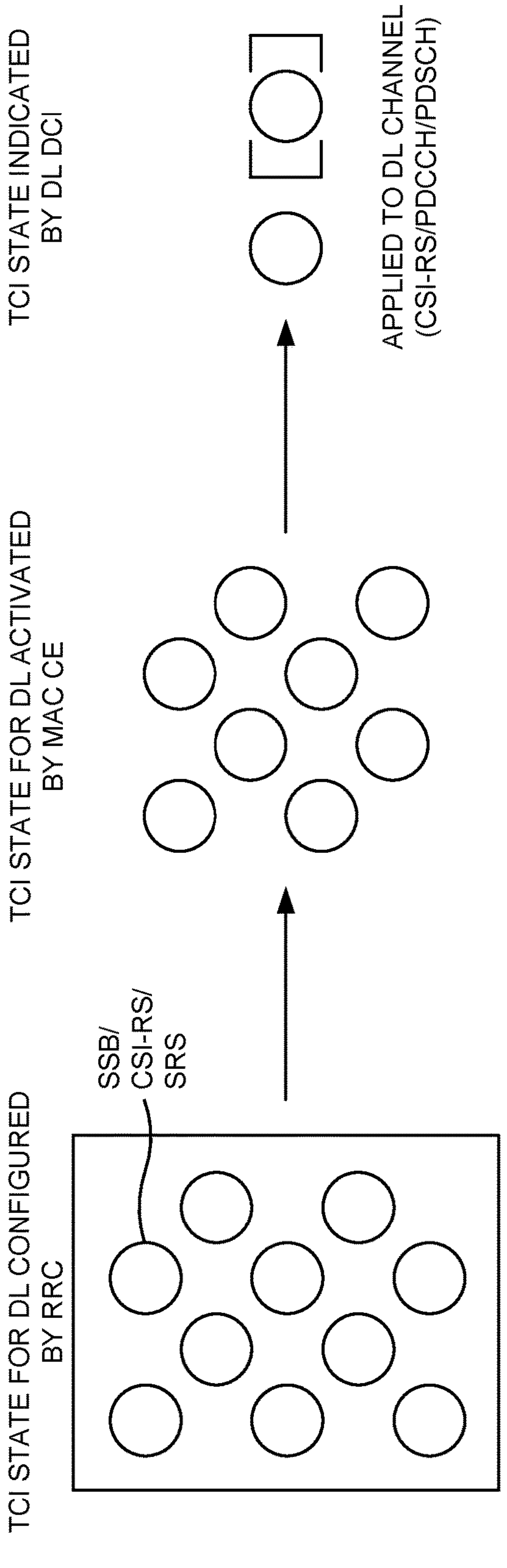
FIGS. 4A and 4B are diagrams illustrating an example of a method of determining a TCI state according to a second embodiment.

In the example of FIG. 4A, the RRC configures a plurality of TCI states for the DL. Each of the TCI states may be the SSB, the CSI-RS, or the SRS. The MAC CE activates a plurality of TCI states for the DL in the configured plurality of TCI states for the DL. The DL DCI indicates at least one of the plurality of TCI states for the activated DL. The indicated TCI state for the DL is applied to the DL channel. The DL channel may be CSI-RS/PDCCH/PDSCH.

Figure 4B:
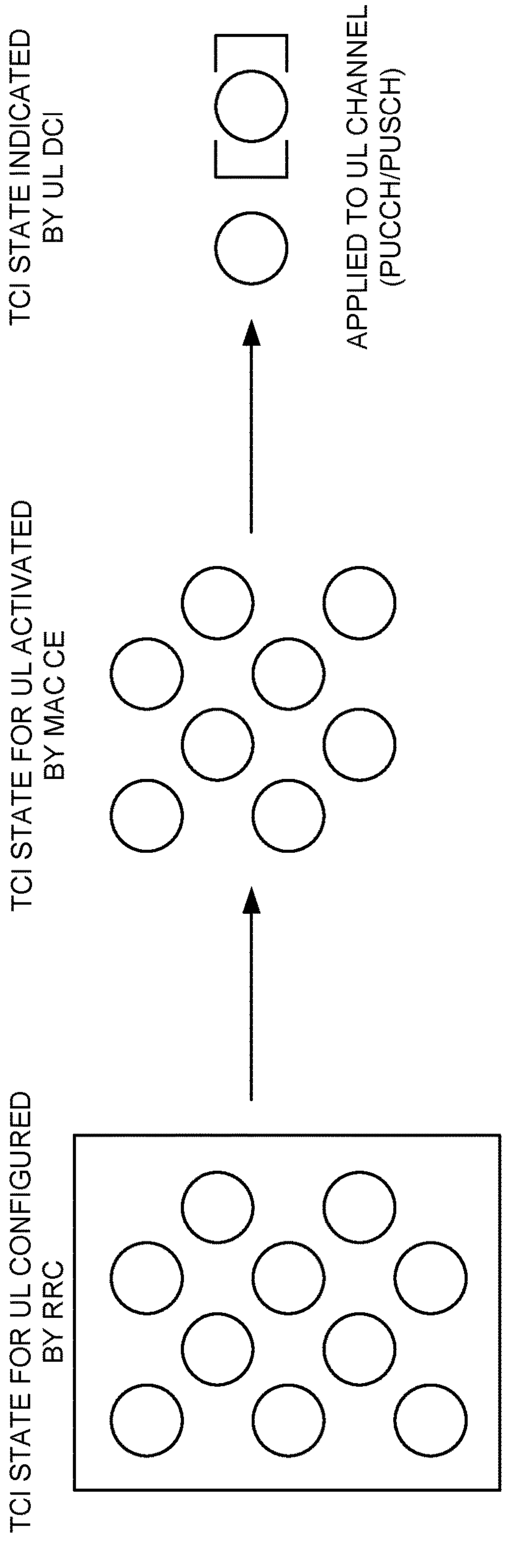

In the example of FIG. 4B, the RRC configures the plurality of TCI states for the UL. Each of the TCI states may be the SSB, the CSI-RS, or the SRS. The MAC CE activates the plurality of TCI states for the UL in the configured plurality of TCI states for the UL. The UL DCI indicates at least one of the plurality of activated TCI states for the UL. The indicated TCI state for the UL is applied to the UL channel. The UL channel may be PUCCH/PUSCH.

First Modification

The RRC may configure a pool of TCI states common to the UL and the DL. One or more TCI states for the DL and one or more TCI states for the UL may be activated from the common pool.

Figure 5:
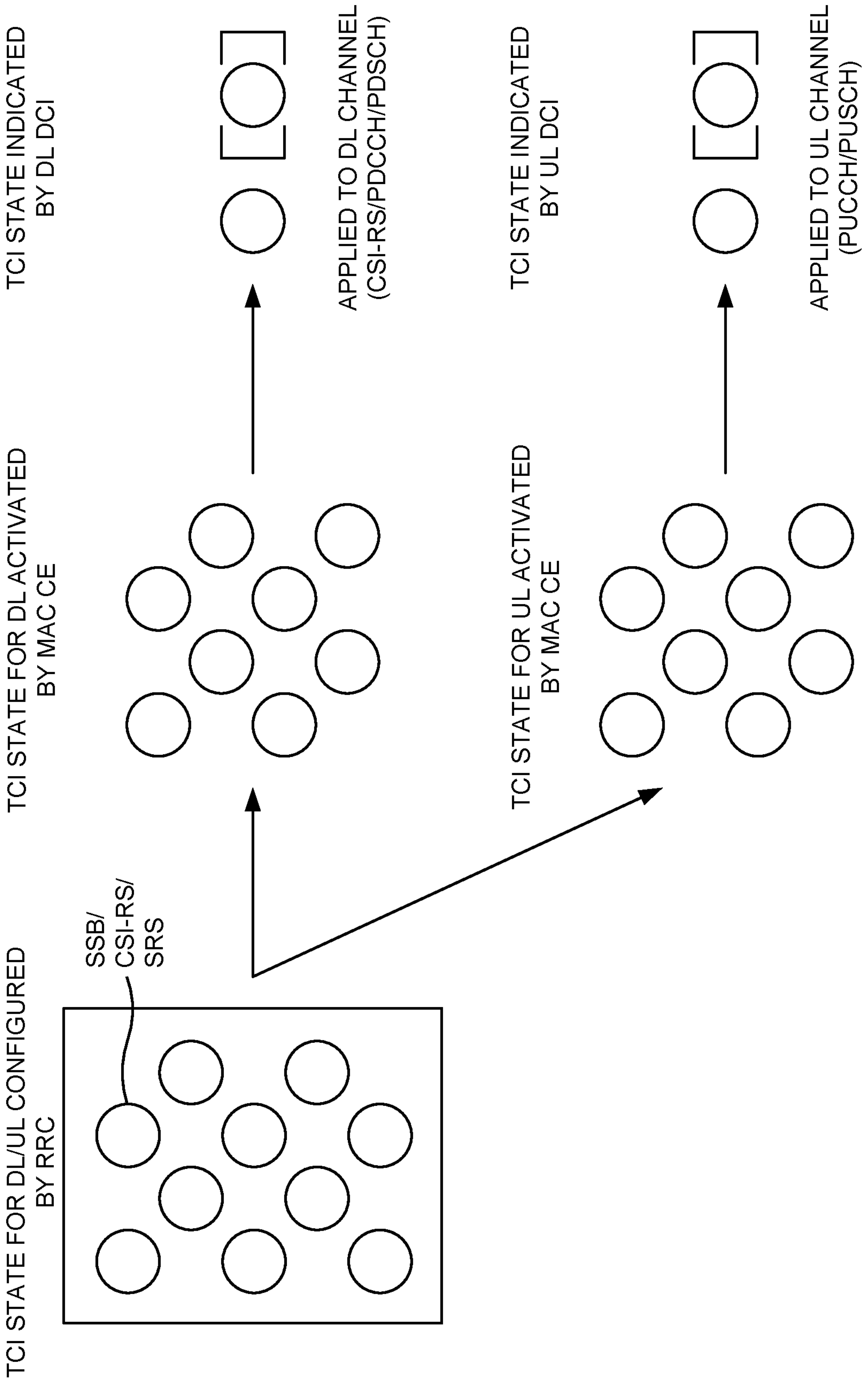
FIG. 5 is a diagram illustrating an example of a method of determining a TCI state according to a first modification of the second embodiment.

In the example of FIG. 5, the RRC configures the plurality of TCI states for the DL and the UL. Each of the TCI states may be the SSB, the CSI-RS, or the SRS.

The first MAC CE activates the plurality of TCI states for the DL among a plurality of configured TCI states. The DL DCI indicates at least one of the plurality of TCI states for the activated DL. The indicated TCI state for the DL is applied to the DL channel. The DL channel may be CSI-RS/PDCCH/PDSCH.

The second MAC CE activates the plurality of TCI states for the UL among the plurality of configured TCI states. The UL DCI indicates at least one of the plurality of activated TCI states for the UL. The indicated TCI state for the UL is applied to the UL channel. The UL channel may be PUCCH/PUSCH.

Second Modification

One or more TCI states for the DL and one or more TCI states for the UL may be independently indicated from the plurality of activated TCI states. The UL DCI and DL DCI may indicate different TCI states.

Figure 6:
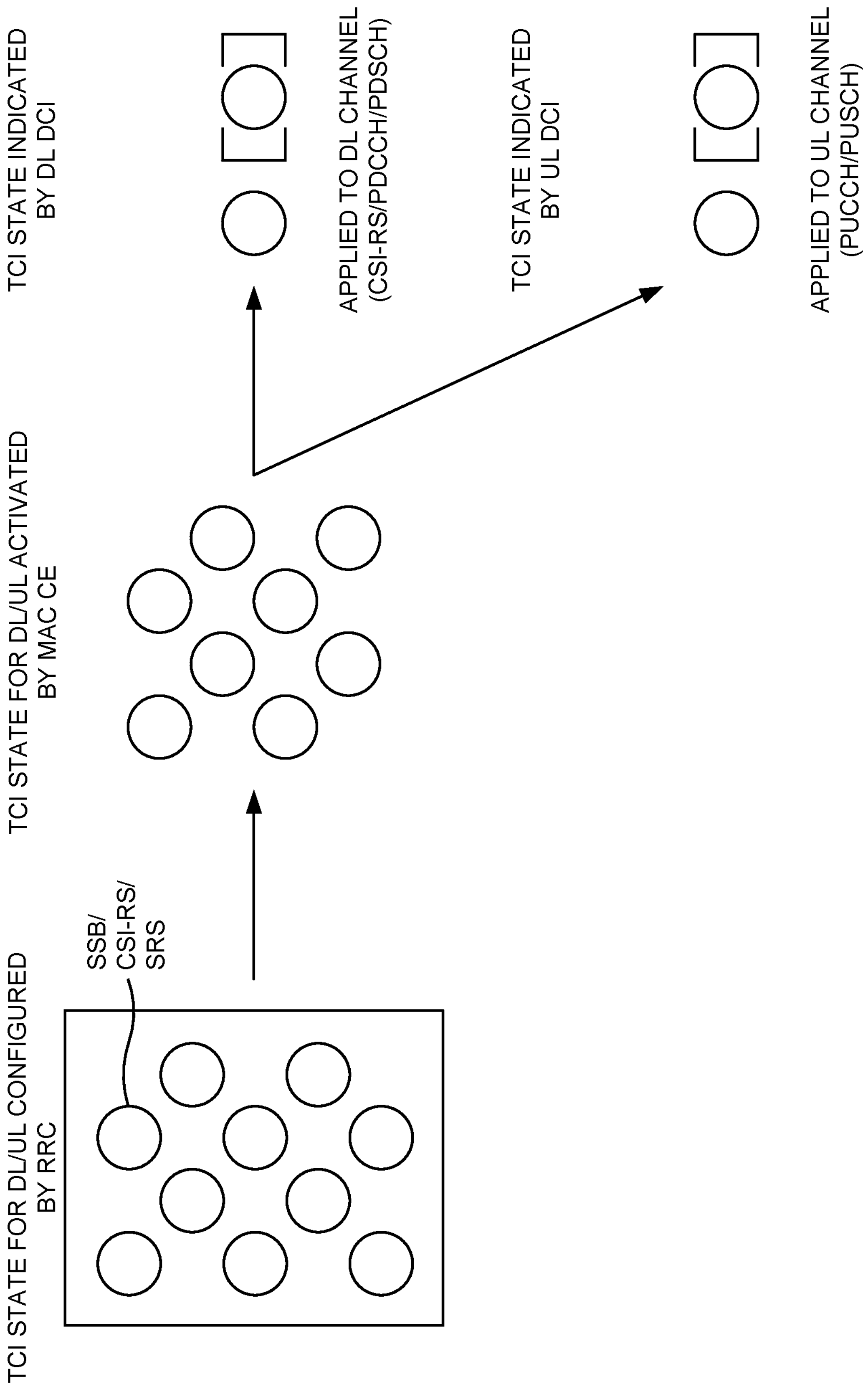
FIG. 6 is a diagram illustrating an example of a method of determining a TCI state according to a second modification of the second embodiment.

In the example of FIG. 6, the RRC configures the plurality of TCI states for the DL and the UL. Each of the TCI states may be the SSB, the CSI-RS, or the SRS. The MAC CE activates the plurality of TCI states among the plurality of configured TCI states.

The DL DCI indicates at least one TCI state for the DL of the plurality of activated TCI states. The indicated TCI state for the DL is applied to the DL channel. The DL channel may be CSI-RS/PDCCH/PDSCH.

The UL DCI indicates at least one TCI state for the UL of the plurality of activated TCI states. The indicated TCI state for the UL is applied to the UL channel. The UL channel may be PUCCH/PUSCH.

According to the second embodiment described above, the TCI state for the DL and the TCI state for the UL can be appropriately determined.

Third Embodiment

The UE may receive the DCI indicating the unified/common TCI state and apply the indicated TCI state at the beam update timing based on the DCI.

The UE may apply the indicated TCI state to a first channel (one or more channels/RS/resources) at a first timing (timing #1). The UE may apply the indicated TCI state to a second channel (one or more channels/RS/resources) at a second timing (timing #2) after the first timing. The UE may apply the indicated TCI state to a third channel (one or more channels/RS/resources) at a third timing (timing #3) after the second timing.

The beam update timing may be determined according to at least one of the following forms 3-1 to 3-6.

<<Form 3-1>>

The DCI may update the common beam for the DL and the UL at at least one timing of reception of the scheduled PDSCH, transmission of the corresponding HARQ-ACK information, and transmission of the scheduled PUSCH. The beam update timing may be similar to that of Rel. 15.

The common beam may be updated after a specific time from the last symbol of the DCI reception. The specific time may be a K symbol or a K slot. K may be defined by the specification, may be configured by the higher layer, or may be reported by the UE as a UE capability.

Figure 7:
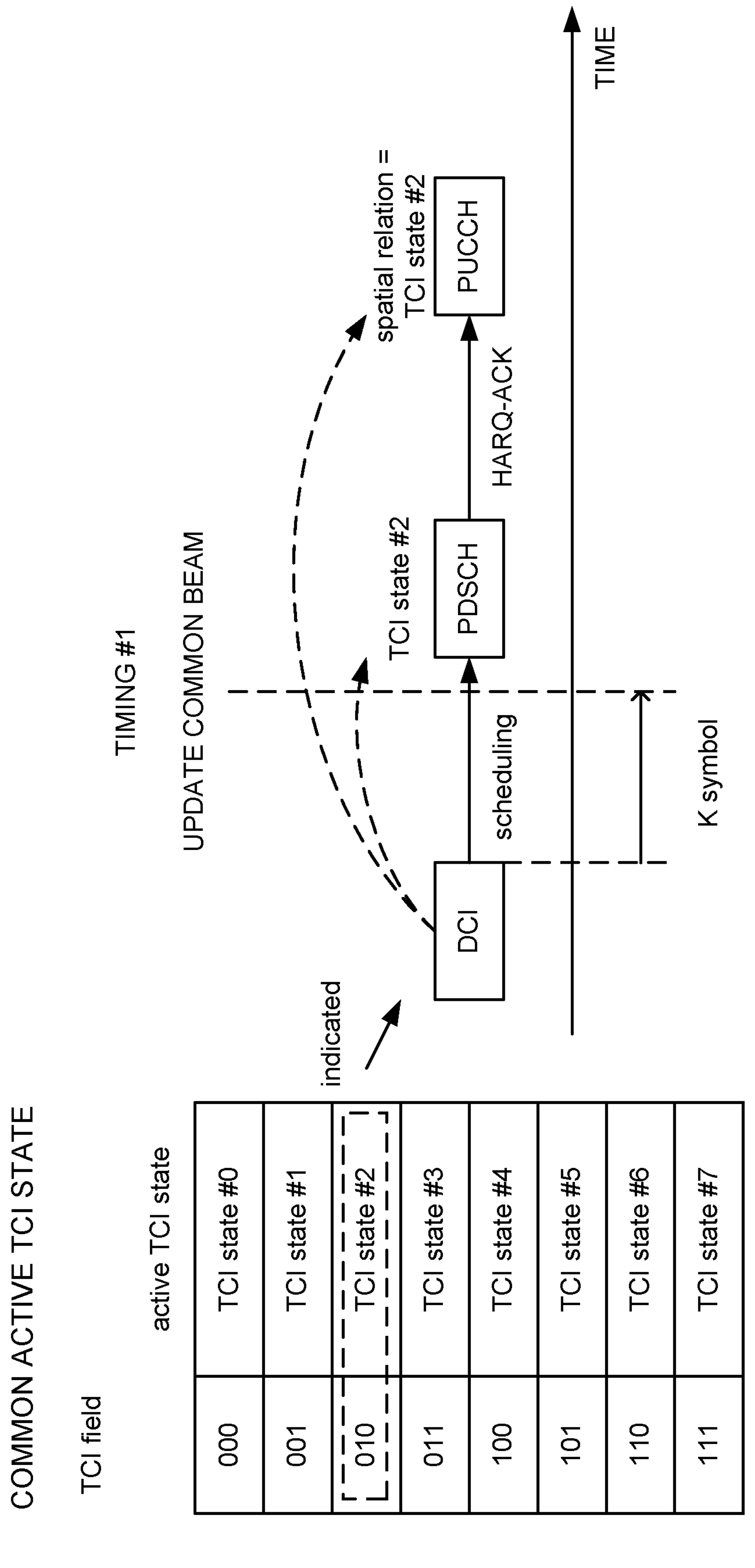
FIG. 7 is a diagram illustrating an example of common beam update according to a form 3-1.

In the example of FIG. 7, the DCI indicates a TCI state #2 among a plurality of active TCI states. The UE updates the common beam to the TCI state #2 after the K symbol (timing #1) from the last symbol of the DCI reception. Thereafter, the TCI state #2 is used for the TCI state of the reception of the PDSCH and the spatial relation of the transmission of the PUCCH including the HARQ-ACK information corresponding thereto. For this TCI state of the PUCCH, no new DCI field for beam indication at the DCI level is required.

<<Form 3-2>>

If the reception of the DCI fails, the base station assumes that the common beam is updated, and the UE assumes that the common beam is not updated. When the reception of the DCI for scheduling the PDSCH fails, whether the base station can reschedule the PDSCH becomes a problem.

When there is a possibility of retransmission of the PDSCH/PUSCH, the UE may monitor the DCI by using the beam before updating.

At the timing of PDSCH reception, the common beam assumption may be updated except for DCI reception, which may schedule retransmission.

Here, the way of identifying the DCI that may schedule retransmission is a problem.

The DCI scheduling the first transmission and the retransmission may use the same CORESET/search space/QCL assumption/TCI state.

Figure 8:
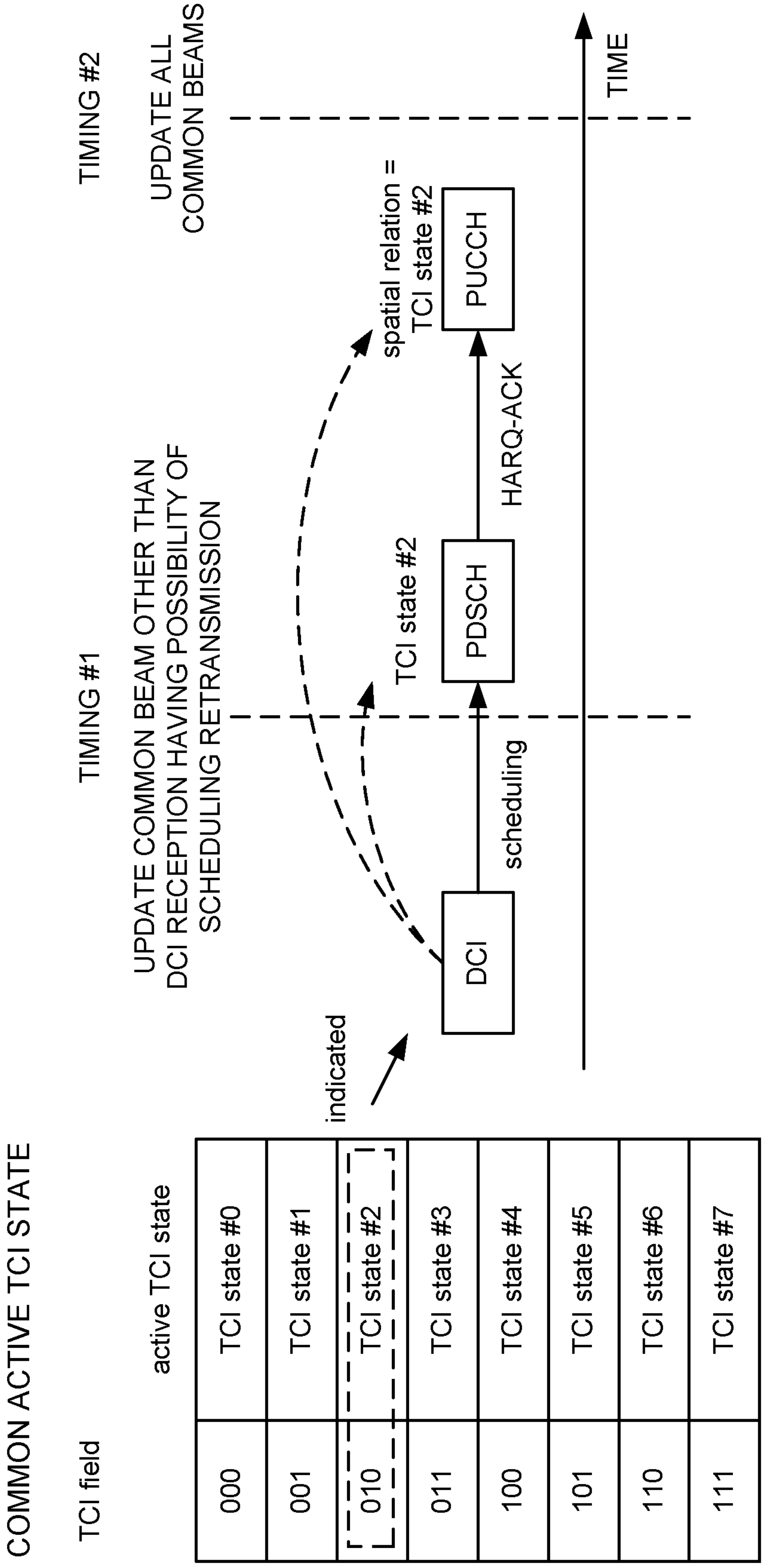
FIG. 8 is a diagram illustrating an example of common beam update according to a form 3-2.

The DCI, the PDSCH, and the PUCCH in the example of FIG. 8 are similar to those in FIG. 7. In this example, at the timing #1, all the common beams except for the CORESET of scheduling of the PDSCH (DCI that may schedule retransmission) are updated, and at the timing #2 after the UE transmits the PUCCH including the ACK or NACK corresponding to the PDSCH, the beam of the CORESET of scheduling of the PDSCH is updated to the common beam.

<<Form 3-3>>

Different beam update timings may be applied to the PDCCH and the others.

The UE may assume at least one of the following assumptions 1 to 4.

[Assumption 1]

One TCI field in a DCI format 1_1/1_2 indicates the common beam for both the DL and the UL or for the DL only.

[Assumption 2]

One TCI field in a DCI format 0_1/0_2 indicates the common beam for both the DL and the UL, or for the UL only.

[Assumption 3]

When independent common beams are used for the DL and the UL, two TCI fields in the DCI format 1_1/1_2 indicate the common beam for the DL and the common beam for the UL, respectively.

[Assumption 4]

When independent common beams for the DL and the UL are used, two TCI fields in the DCI format 0_1/0_2 indicate the common beam for the DL and the common beam for the UL, respectively.

Figure 9:
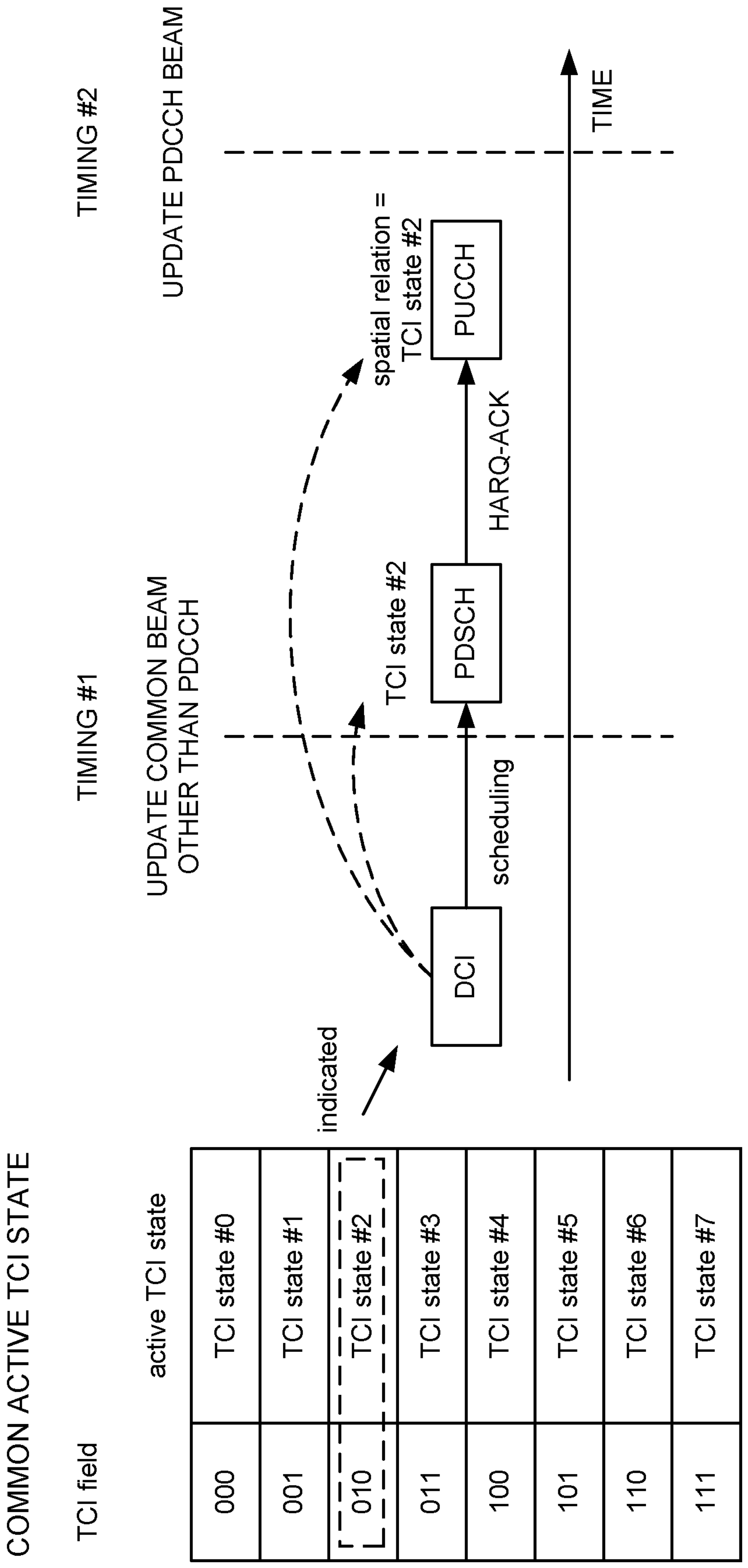
FIG. 9 is a diagram illustrating an example of common beam update according to a form 3-3.

The DCI, the PDSCH, and the PUCCH in the example of FIG. 9 are similar to those in FIG. 7. In this example, the common beam excluding the PDCCH is updated at the timing #1. At the timing #2, the PDCCH beam is updated to the common beam.

<<Form 3-4>>

The indicated TCI state may be used for PDSCH reception. This TCI state may be indicated by the new TCI field. If the scheduling offset (time offset) between the DCI and the PDSCH scheduled thereby is smaller than a threshold (for example, timeDurationForQCL), a default DL beam (TCI state) may be applied for the PDSCH reception (same as in Rel. 15).

The indicated TCI state, or the previous common TCI state, or the configured spatial relation may be applied to the PUCCH.

In this case, no beam discrepancy occurs between the UE and the base station.

Figure 10:
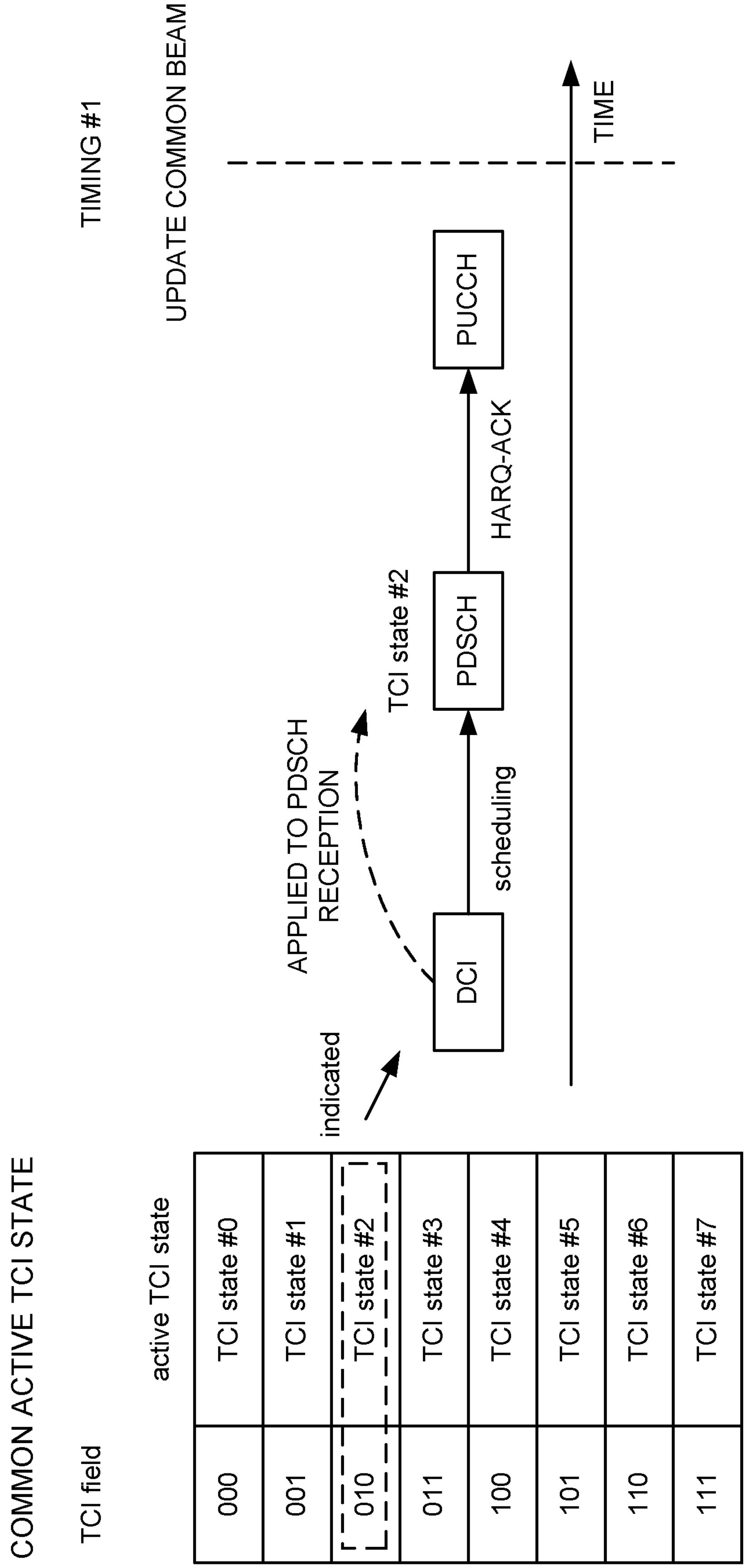
FIG. 10 is a diagram illustrating an example of common beam update according to a form 3-4.

The DCI, the PDSCH, and the PUCCH in the example of FIG. 10 are similar to those in FIG. 7. In this example, the TCI state #2 indicated by the DCI is applied to the PDSCH reception and the common beam is updated after the PUCCH transmission (timing #1).

<<Form 3-5>>

After the UE sends the HARQ-ACK information, the common beam for all channels may be updated. DCI level beam update may not be possible for the PDSCH.

The TCI field of Rel. 15 may be reused to allow the DCI level beam update to the PDSCH. The TCI field in Rel. 15 may be applied only to the scheduled PDSCH. The new TCI field may be applied to all channels.

Figure 11:
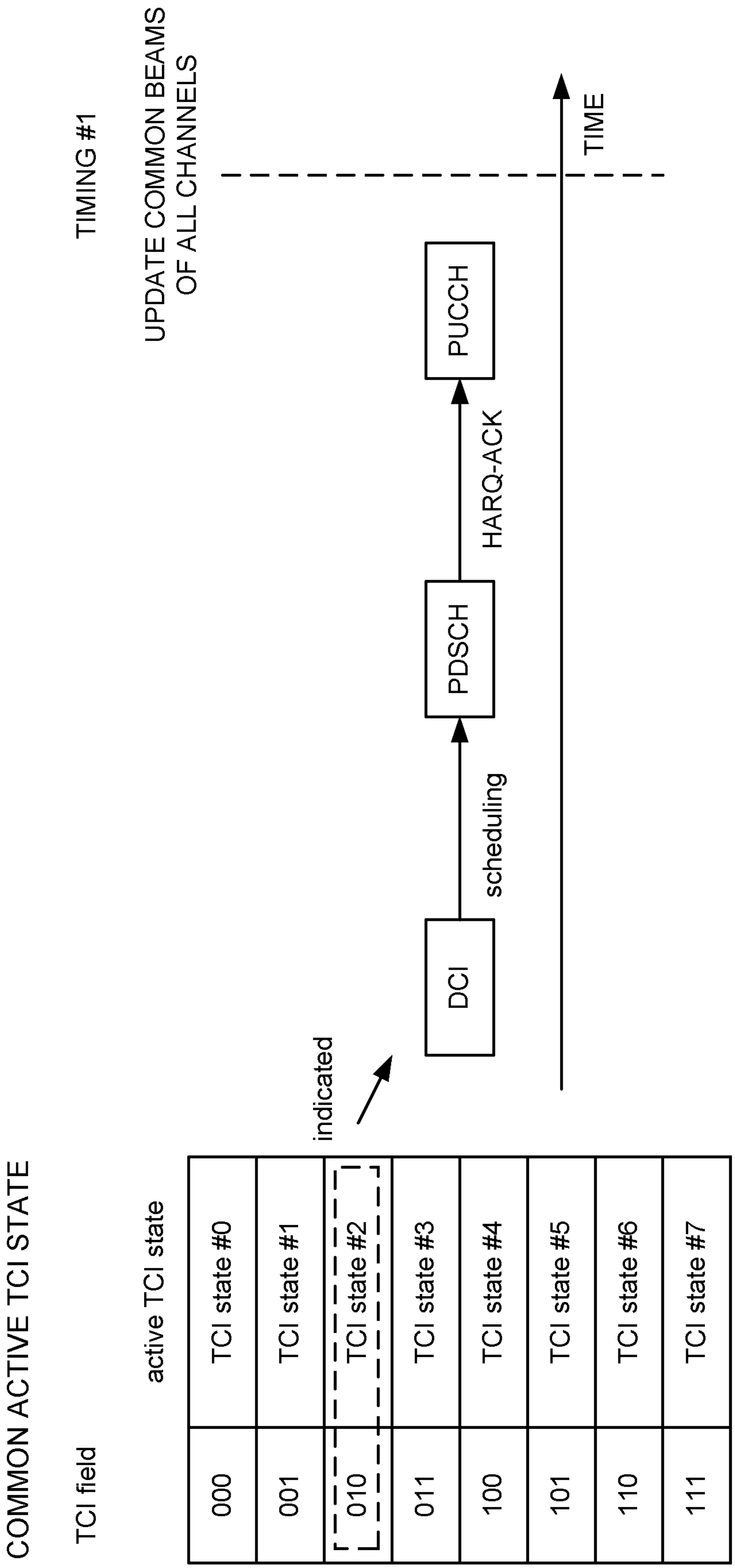
FIG. 11 is a diagram illustrating an example of common beam update according to a form 3-5.

The DCI, the PDSCH, and the PUCCH in the example of FIG. 11 are similar to those in FIG. 7. In this example, after the PUCCH transmission (timing #1), the common beam for all channels/RSs is updated.

<<Form 3-6>>

At least one of the forms 3-1 to 3-5 may be applied to the PUSCH. In at least one of the forms 3-1 to 3-5, PDSCH reception may be replaced with PUSCH transmission and HARQ-ACK information (PUCCH) transmission may be replaced with PUSCH transmission.

Figure 12:
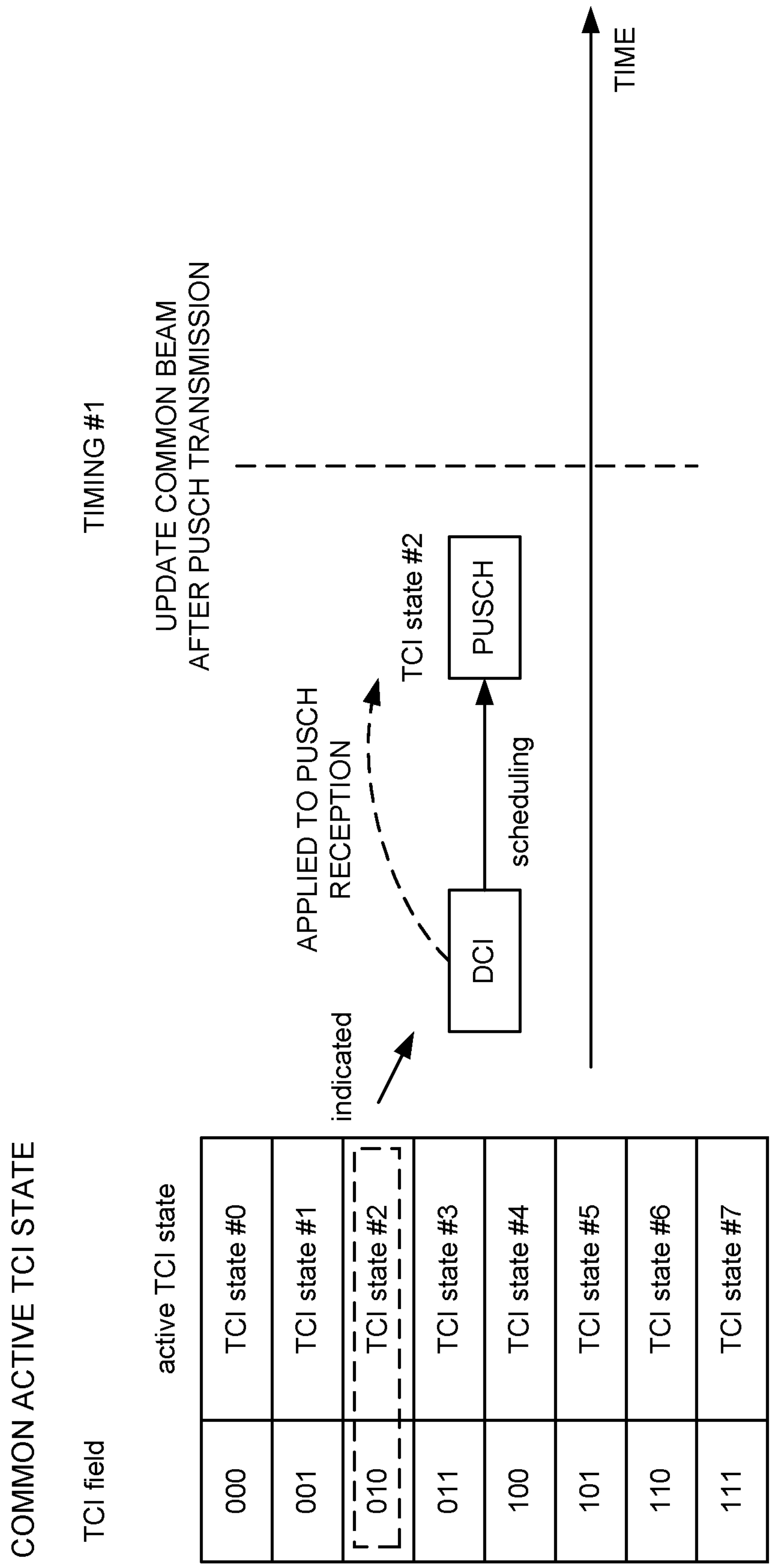
FIG. 12 is a diagram illustrating an example of common beam update according to a form 3-6.

FIG. 12 illustrates a case where the form 3-4 is applied to the PUSCH. In this example, the DCI indicates the TCI state #2 among the plurality of active TCI states. This DCI schedules the PUSCH. The UE applies the indicated TCI state to the PUSCH transmission. After the PUSCH transmission (timing #1), the common beam is updated.

According to the third embodiment described above, the recognition of the DL/UL beams can be matched between the UE and the base station.

Fourth Embodiment

In the forms 3-1 to 3-4, the beam of the PDSCH is updated by the DCI scheduling the same. The UE needs to assume QCL assumption for buffering a received signal, but before the DCI decoding, the UE does not know whether the PDSCH is scheduled or not.

The UE may assume a default DL beam (similar to Rel. 15) (default TCI state of the PDSCH) to buffer the received signal. The UE may apply the default TCI state to the reception from the reception of the DCI to the beam update timing.

According to the fourth embodiment described above, even when the beam is indicated by the DCI for scheduling the PDSCH, the UE can appropriately receive the PDSCH.

Fifth Embodiment

At least one of the first to fourth embodiments may be applied to a specific CORESET.

The specific CORESET may be all CORESETs.

The specific CORESET may be all CORESETs having a TCI state. At least one of the first to fourth embodiments may not be applied to CORESET0 having no TCI state configuration. The CORESET0 may be used for fallback to beam management of Rel. 15/16.

The specific CORESET may be a CORESET excluding the CORESET0. At least one of the first to fourth embodiments may not be applied to the CORESET0.

The specific CORESET may be a CORESET (CORESET for single TRP) excluding a CORESET in which multiple TRPs (CORESET pool index, CORESET pool index at "1") are configured. At least one of the first to fourth embodiments may not be applied to the CORESET in which the multiple TRPs are configured. The unified TCI framework may be used for the single TRP.

According to the fifth embodiment described above, the UE can apply the common beam to the appropriate CORESET.

Sixth Embodiment

If a new TCI field is applied to a plurality of or all channels of UL/DL, it may not be necessary for the common beam to be updated at all timings of DCI reception.

The code point of the new TCI field may include a no-update state. If the no-update state is indicated by the DCI, the UE may maintain the common beam. The no-update state may be identified by a specific code point. The specific code point may be 000, or may be configured by a higher layer.

In the example of FIG. 13, active TCI states #1 to #7 in the common active TCI state pool are associated with code points 001 to 111 of the new TCI field, respectively. If the new TCI field indicates any of the code points 001 to 111, the UE updates the common beam to a TCI state corresponding to the code point. The specific code point 000 is associated with the no-update state. If the new TCI field indicates the code point 000, the UE maintains the common beam.

According to the sixth embodiment described above, whether to update the common beam is appropriately indicated.

Seventh Embodiment

UE capability corresponding to at least one function (characteristics, features) in the first to sixth embodiments may be defined. If the UE reports this UE capability, the UE may perform a corresponding function. If the UE reports this UE capability and configures a higher layer parameter corresponding to this function, the UE may perform the corresponding function. A higher layer parameter (RRC information element) corresponding to this function may be defined. When this higher layer parameter is configured, the UE may perform a corresponding function.

The UE capability may indicate whether the UE supports this function.

The UE capability may indicate the maximum number of the TCI states supported by the UE and configured by the RRC. The maximum number of TCI states configured by the RRC may be the maximum number of TCI states configured for all of the UL and the DL. The maximum number of TCI states configured by the RRC may be reported independently of the maximum number of TCI states configured for the UL and the maximum number of TCI states configured for the DL.

The UE capability may indicate the maximum number of active TCI states supported by the UE. The maximum number of active TCI states may be the maximum number of active TCI states for all of the UL and DL. The maximum number of active TCI states may be reported independently of the maximum number of active TCI states for the UL and the maximum number of active TCI states for the DL.

The UE capability may indicate whether the UE supports different active TCI state pools for the UL and the DL.

According to the seventh embodiment described above, the UE can implement at least one function described above while maintaining compatibility with existing specifications.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 14:
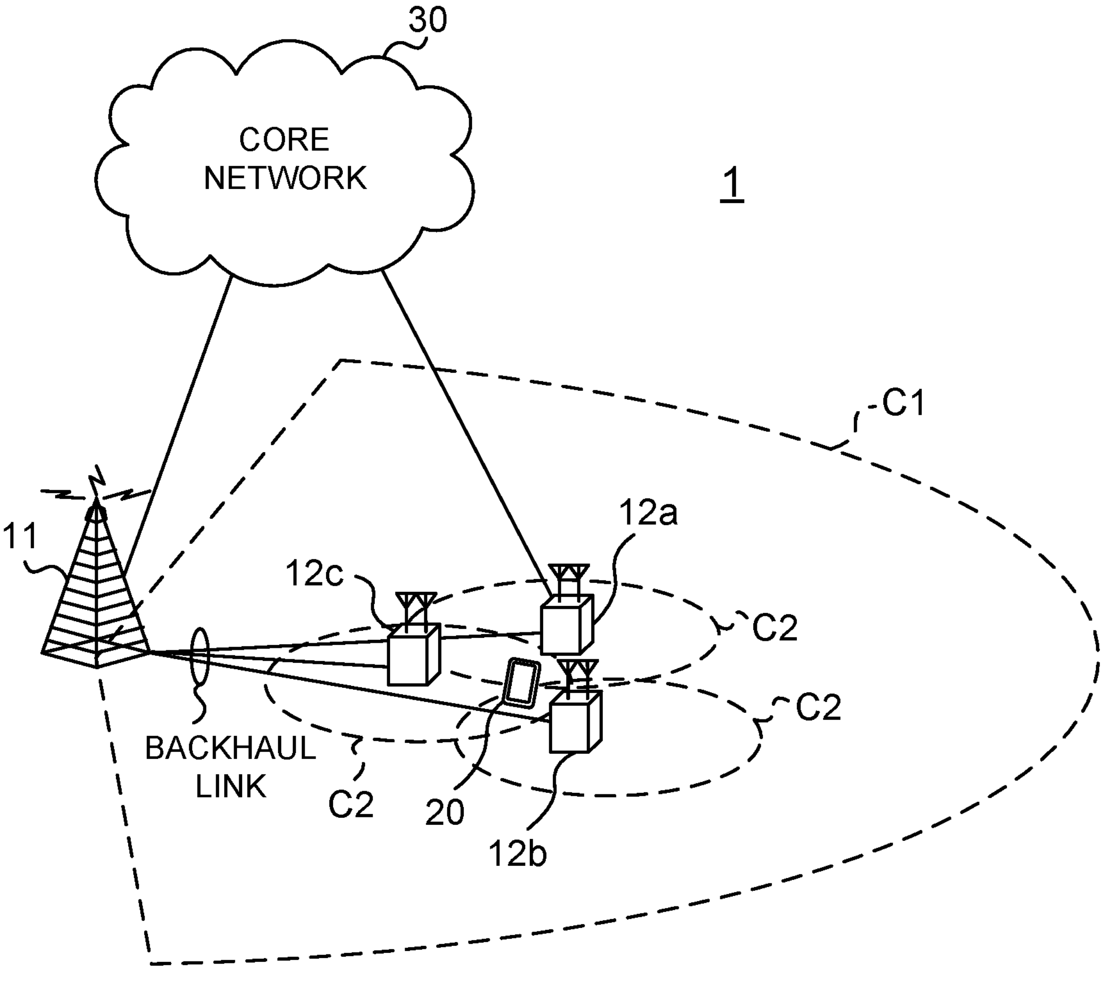
FIG. 14 is a diagram illustrating an example of a schematic configuration of a radio communication system according to one embodiment.

FIG. 14 is a diagram illustrating an example of a schematic configuration of the radio communication system according to one embodiment. A radio communication system 1 may be a system configured to implement communication using long term evolution (LTE), 5th generation mobile communication system New Radio (5G NR), and the like drafted as the specification by third generation partnership project (3GPP).

In addition, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, the NR base station (gNB) is the MN, and the LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 configured to form a macro cell C1 with a relatively wide coverage, and base stations 12 (12*a* to 12*c*) disposed within the macro cell C1 and configured to form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as base stations 10 when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a frequency range 1 (FR1) or a second frequency range 2 (FR2). The macro cell C1 may be included in the FR1, and the small cell C2 may be included in the FR2. For example, the FR1 may be a frequency range of 6 GHz or less (sub-6 GHz), and the FR2 may be a frequency range higher than 24 GHz (above-24 GHz). It is noted that the frequency bands, definitions, and the like of the FR1 and the FR2 are not limited thereto, and, for example, the FR1 may correspond to a frequency band higher than the FR2.

In addition, the user terminal 20 may perform communication in each CC using at least one of time division duplex (TDD) and frequency division duplex (FDD).

The plurality of base stations 10 may be connected to each other by wire (for example, an optical fiber or an X2 interface in compliance with common public radio interface (CPRI)) or wirelessly (for example, NR communication). For example, when the NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an evolved packet core (EPC), a 5G core network (5GCN), and a next generation core (NGC).

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. It is noted that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH), a physical broadcast channel (PBCH), a physical downlink control channel (PDCCH), or the like shared by the user terminals 20 may be used.

In addition, in the radio communication system 1, as an uplink channel, a physical uplink shared channel (PUSCH), a physical uplink control channel (PUCCH), a physical random access channel (PRACH), or the like shared by the user terminals 20 may be used.

User data, higher layer control information, a system information block (SIB), and the like are transmitted on the PDSCH. The PUSCH may transmit the user data, the higher layer control information, and the like. In addition, a master information block (MIB) may be transmitted on the PBCH.

Lower layer control information may be transmitted on the PDCCH. The lower layer control information may include, for example, downlink control information (DCI) including scheduling information of at least one of the PDSCH and the PUSCH.

It is noted that the DCI that schedules the PDSCH may be referred to as DL assignment, DL DCI, or the like, and the DCI that schedules PUSCH may be referred to as UL grant, UL DCI, or the like. It is noted that the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space based on search space configuration.

One search space may correspond to a PDCCH candidate corresponding to one or more aggregation levels. One or more search spaces may be referred to as a search space set. It is noted that "search space" and "search space set", "search space configuration" and "search space set configuration", and "CORESET" and "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), and scheduling request (SR) may be transmitted on the PUCCH. A random access preamble for establishing connection with a cell may be transmitted on the PRACH.

It is noted that, in the present disclosure, downlink, uplink, and the like may be expressed without "link". In addition, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) and a secondary synchronization signal (SSS). A signal block including the SS (PSS or SSS) and the PBCH (and the DMRS for the PBCH) may be referred to as an SS/PBCH block, an SS block (SSB), or the like. It is noted that, the SS, the SSB, or the like may also be referred to as a reference signal.

In addition, in the radio communication system 1, a sounding reference signal (SRS), a demodulation reference signal (DMRS), or the like may be transmitted as an uplink reference signal (UL-RS). It is noted that, DMRSs may be referred to as user terminal-specific reference signals (UE-specific Reference Signals).

(Base Station)

Figure 15:
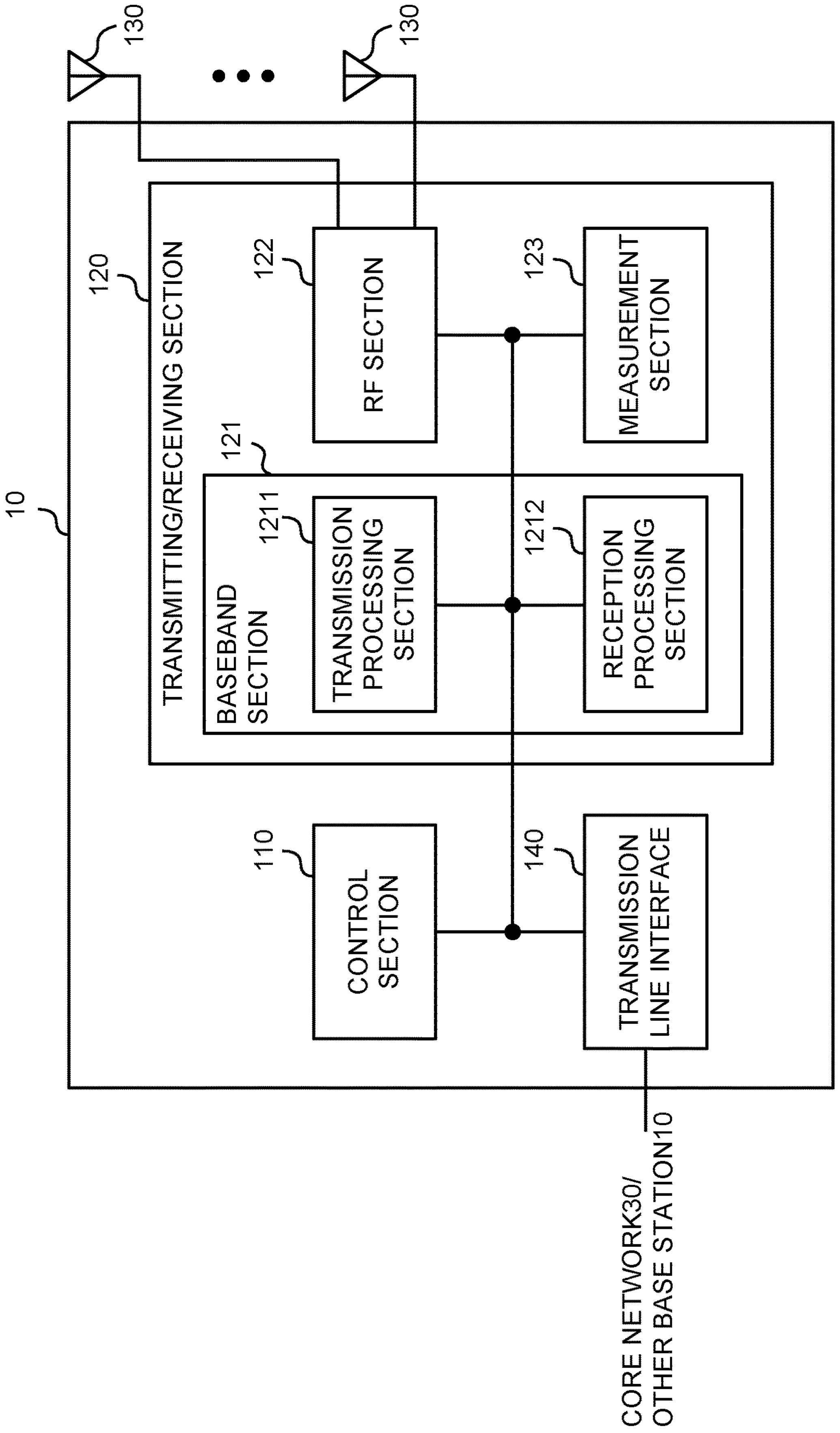
FIG. 15 is a diagram illustrating an example of a configuration of a base station according to one embodiment.

FIG. 15 is a diagram illustrating an example of a configuration of the base station according to one embodiment. The base station 10 includes a control section 110, a transmitting/receiving section 120, a transmitting/receiving antenna 130, and a transmission line interface 140. It is noted that one or more control sections 110, one or more transmitting/receiving sections 120, one or more transmitting/receiving antennas 130, and one or more transmission line interfaces 140 may be included.

It is noted that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can include a controller, a control circuit, and the like that are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmitting/receiving antenna 130, and the transmission line interface 140. The control section 110 may generate data, control information, a sequence, and the like to be transmitted as signals, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 120 may be configured as an integrated transmitting/receiving section, or may be configured by a transmitting section and a receiving section. The transmitting section may include the transmission processing section 1211 and the RF section 122. The receiving section may include the reception processing section 1212, the RF section 122, and the measurement section 123.

The transmitting/receiving antenna 130 can include antennas described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correcting encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmitting/receiving antenna 130.

Meanwhile, the transmitting/receiving section 120 (RF section 122) may perform amplification, filtering processing, demodulation to a baseband signal, and the like on the signal in the radio frequency band received by the transmitting/receiving antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, another base stations 10, and the like, and may acquire, transmit, and the like user data (user plane data), control plane data, and the like for the user terminal 20.

It is noted that the transmitting section and the receiving section of the base station 10 in the present disclosure may include at least one of the transmitting/receiving section 120, the transmitting/receiving antenna 130, and the transmission line interface 140.

The transmitting/receiving section 120 may transmit downlink control information (DCI) indicating a transmission configuration indication (TCI) state applicable to downlink and uplink. The control section 110 may apply the TCI state at a timing based on the DCI.

(User Terminal)

Figure 16:
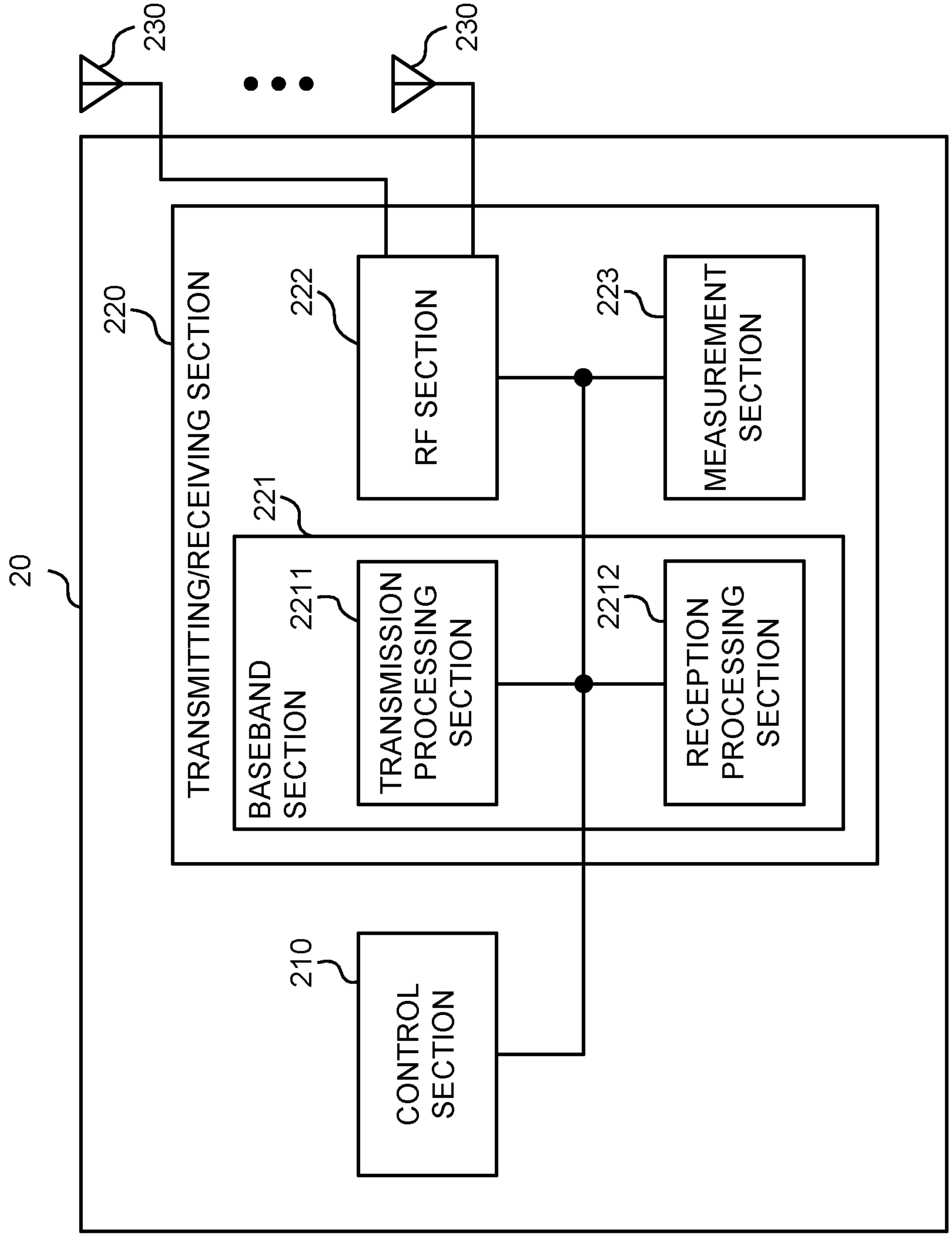
FIG. 16 is a diagram illustrating an example of a configuration of a user terminal according to one embodiment.

FIG. 16 is a diagram illustrating an example of a configuration of the user terminal according to one embodiment. The user terminal 20 includes a control section 210, a transmitting/receiving section 220, and a transmitting/receiving antenna 230. It is noted that one or more of the control sections 210, one or more of the transmitting/receiving sections 220, and one or more of the transmitting/receiving antennas 230 may be included.

It is noted that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described based on common recognition in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data, control information, a sequence, and the like to be transmitted as signals, and may forward the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmitting/receiving antenna 230 can include an antenna described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correcting encoding), modulation, mapping, filtering processing, DFT processing (if necessary), IFFT processing, precoding, or digital-analog conversion on the bit string to be transmitted, to output a baseband signal.

It is noted that whether or not to apply DFT processing may be determined based on configuration of transform precoding. In a case where transform precoding is enabled for a certain channel (e.g., PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency band, filtering processing, amplification, and the like on the baseband signal, to transmit a signal in the radio frequency band via the transmitting/receiving antenna 230.

Meanwhile, the transmitting/receiving section 220 (RF section 222) may perform amplification, filtering processing, demodulation to a baseband signal, and the like on the signal in the radio frequency band received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

It is noted that the transmitting section and the receiving section of the user terminal 20 in the present disclosure may include at least one of the transmitting/receiving section 220 and the transmitting/receiving antenna 230.

The transmitting/receiving section 220 may receive the downlink control information (DCI) indicating a transmission configuration indication (TCI) state applicable to downlink and uplink. The control section 210 may apply the TCI state at a timing based on the DCI.

The control section 210 may apply the default TCI state to the reception from the reception of the DCI to the timing.

The control section 210 may apply the TCI state to a specific control resource set at the timing.

The control section 210 may apply the TCI state to a first channel at a first timing. The control section 210 may apply the TCI state to a second channel at a second timing after the first timing.

Hardware Configuration

It is noted that the block diagrams that have been used to describe the above embodiments illustrate blocks in functional units. These functional blocks (components) may be implemented in any combinations of at least one of hardware and software. In addition, the method of implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be implemented by combining the one apparatus or the plurality of apparatuses with software.

Here, the function includes, but is not limited to, determining, deciding, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 17:
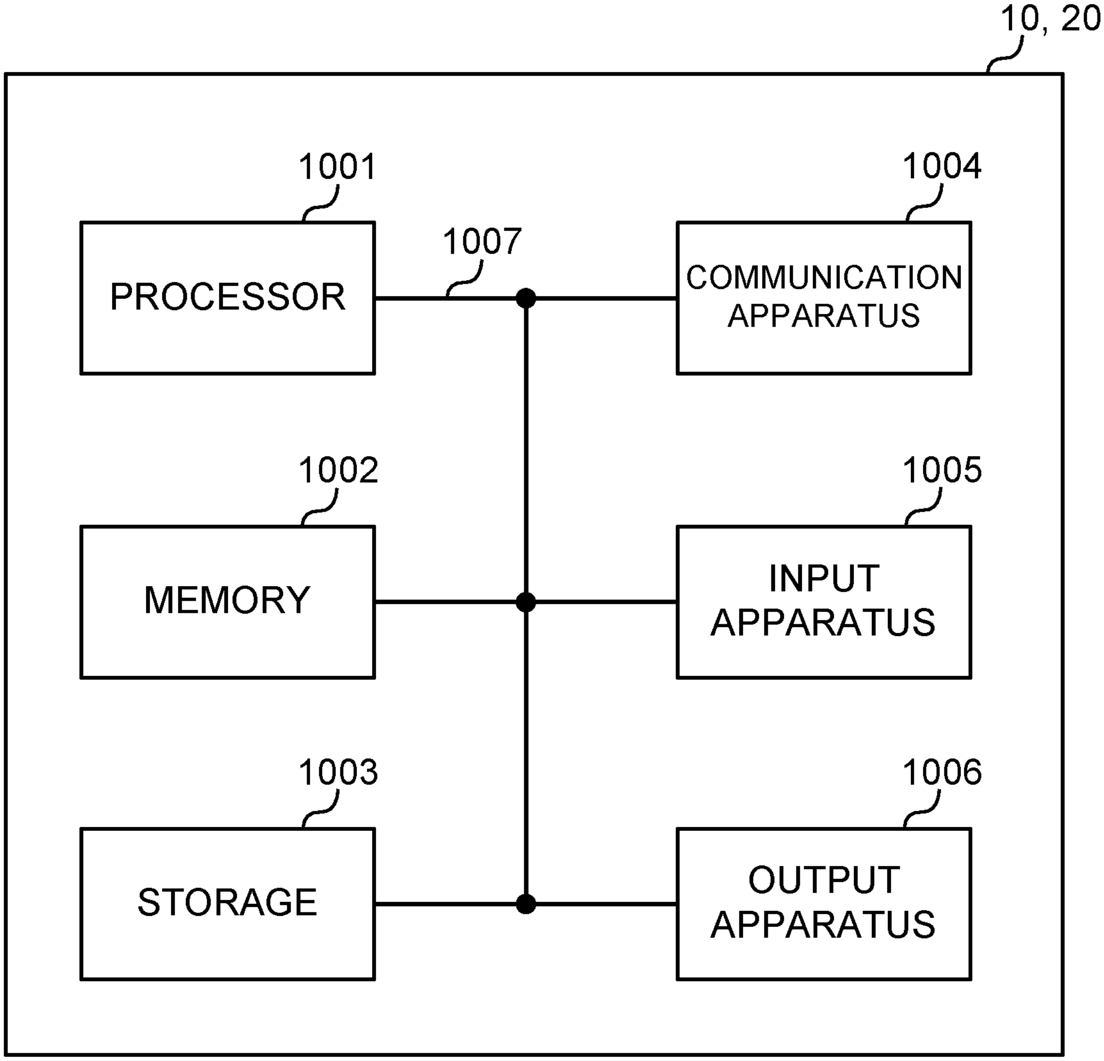
FIG. 17 is a diagram illustrating an example of a hardware configuration of the base station and the user terminal according to one embodiment.

For example, the base station, the user terminal, and the like according to one embodiment of the present disclosure may function as a computer configured to execute the processing of the radio communication method of the present disclosure. FIG. 17 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

It is noted that, in the present disclosure, the terms such as an apparatus, a circuit, a device, a section, or a unit can be replaced with each other. The hardware configuration of the base station 10 and the user terminal 20 may be configured to include one or more of the apparatuses illustrated in the drawings, or may be configured not to include some apparatuses.

For example, although only one processor 1001 is shown, a plurality of processors may be provided. In addition, the processing may be executed by one processor, or the processing may be executed by two or more processors simultaneously or sequentially, or using other methods. It is noted that the processor 1001 may be implemented with one or more chips.

Each function of the base station 10 and the user terminal 20 is implemented by given software (program) being read on hardware such as the processor 1001 and the memory 1002, by which the processor 1001 performs operations, controlling communication via the communication apparatus 1004, and controlling at least one of reading and writing of data at the memory 1002 and the storage 1003.

The processor 1001 may control the whole computer by, for example, running an operating system. The processor 1001 may be implemented by a central processing unit (CPU) including an interface with peripheral equipment, a control apparatus, an operation apparatus, a register, and the like. For example, at least a part of the above-described control section 110(210), transmitting/receiving section 120 (220), and the like may be implemented by the processor 1001.

In addition, the processor 1001 reads programs (program codes), software modules, data, and the like from at least one of the storage 1003 and the communication apparatus 1004 into the memory 1002, and performs various types of processing according to these. As the program, a program that causes a computer to execute at least a part of the operation described in the above-described embodiment is used. For example, the control section 110(210) may be implemented by control programs stored in the memory 1002 and configured to operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), and other appropriate storage media. The memory 1002 may be referred to as a register, a cache, a main memory (primary storage apparatus), and the like. The memory 1002 can store programs (program codes), software modules, and the like that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, and other appropriate storage media. The storage 1003 may be referred to as secondary storage apparatus.

The communication apparatus 1004 is hardware (transmission/reception device) for performing inter-computer communication via at least one of a wired network and a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120(220), the transmitting/receiving antenna 130(230), and the like described above may be implemented by the communication apparatus 1004. The transmitting/receiving section 120(220) may be implemented by being physically or logically separated into the transmitting section 120*a*(220*a*) and the receiving section 120*b*(220*b*).

The input apparatus 1005 is an input device for receiving input from the outside (for example, a keyboard, a mouse, a microphone, a switch, a button, a sensor, and the like). The output apparatus 1006 is an output device that performs output to the outside (for example, a display, a speaker, a light emitting diode (LED) lamp, or the like). It is noted that the input apparatus 1005 and the output apparatus 1006 may be provided in an integrated structure (for example, a touch panel).

Furthermore, these pieces of apparatus (these apparatus), including the processor 1001, the memory 1002 and so on are connected to each other by the bus 1007 so as to communicate information. The bus 1007 may be formed with a single bus, or may be formed with buses that vary between pieces of apparatus (between apparatus).

In addition, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware (these hardware).

(Variations)

It is noted that terms described in the present disclosure and terms necessary for understanding the present disclosure may be replaced with terms that have the same or similar meanings. For example, a channel, a symbol, and a signal (signal or signaling) may be replaced with each other. In addition, the signal may be a message. The reference signal can be abbreviated to an RS, and may be referred to as a pilot, a pilot signal, and the like, depending on which standard applies. In addition, a component carrier (CC) may be referred to as a cell, a frequency carrier, a carrier frequency, and the like.

A radio frame may include one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter applied to at least one of transmission and reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, and specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). Further, a slot may be a time unit based on numerology.

The slot may include a plurality of mini slots. Each mini slot may include one or more symbols in the time domain. In addition, the mini slot may be referred to as a subslot. Each mini slot may include fewer symbols than the slot. A PDSCH (or PUSCH) transmitted in a time unit larger than the mini slot may be referred to as PDSCH (PUSCH) mapping type A. A PDSCH (or a PUSCH) transmitted using a mini slot may be referred to as PDSCH (PUSCH) mapping type B.

A radio frame, a subframe, a slot, a minislot and a symbol all represent the time unit in signal communication. The radio frame, the subframe, the slot, the mini slot, and the symbol may be called by other applicable names, respectively. It is noted that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe and the TTI may be a subframe (1 ms) in the existing LTE, may be a period shorter than 1 ms (for example, one to thirteen symbols), or may be a period longer than 1 ms. It is noted that the unit to represent the TTI may be referred to as a "slot", a "mini slot" and so on, instead of a "subframe".

Here, a TTI refers to, for example, the minimum time unit of scheduling in radio communication. For example, in the LTE system, a base station performs scheduling to allocate radio resources (a frequency bandwidth, transmission power, and the like that can be used in each user terminal) to each user terminal in TTI units. It is noted that the definition of TTIs is not limited to this.

The TTI may be a transmission time unit of a channel-coded data packet (transport block), a code block, a codeword, and the like or may be a processing unit of scheduling, link adaptation, and the like. It is noted that when the TTI is given, a time interval (for example, the number of symbols) to which a transport block, a code block, a codeword, or the like is actually mapped may be shorter than the TTI.

It is noted that, when one slot or one minislot is referred to as a "TTI", one or more TTIs (that is, one or multiple slots or one or more minislots) may be the minimum time unit of scheduling. Further, the number of slots (the number of minislots) to constitute this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

It is noted that a long TTI (for example, a usual TTI, a subframe, and the like) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and, for example, may be twelve. The number of subcarriers included in the RB may be determined based on a numerology.

Additionally, the RB may include one or more symbols in the time domain, and may be one slot, one minislot, one subframe or one TTI in length. One TTI, one subframe, and the like may each be formed of one or more resource blocks.

It is noted that one or more RBs may be referred to as a physical resource block (physical RB (PRB)), a subcarrier group (SCG), a resource element group (REG), a PRB pair, an RB pair, and the like.

In addition, the resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a BWP and numbered within the BWP.

The BWP may include a UL BWP (BWP for UL) and DL BWP (BWP for DL). For the UE, one or more BWPs may be configured within one carrier.

At least one of the configured BWPs may be active, and the UE does not have to expect transmission/reception of a given signal/channel outside the active BWP. It is noted that "cell", "carrier", and the like in the present disclosure may be replaced with "BWP".

It is noted that the structures of radio frames, subframes, slots, minislots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

In addition, the information, parameters, and the like described in the present disclosure may be represented using absolute values, or may be represented using relative values with respect to given values, or may be represented using other corresponding information. For example, a radio resource may be indicated by a given index.

The names used for parameters and the like in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, and the like described in the present disclosure may be represented using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

In addition, information, signals, and the like can be output in at least one of a direction from a higher layer to a lower layer or a direction from a lower layer to a higher layer. Information, signals and so on may be input and output via a plurality of network nodes.

The information, signals and so on that are input and/or output may be stored in a specific location (for example, in a memory), or may be managed in a management table. The information, signals, and the like to be input and output can be overwritten, updated, or appended. The output information, signals, and the like may be deleted. The information, signals and so on that are input may be transmitted to other pieces of apparatus (other apparatus).

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

It is noted that the physical layer signaling may be referred to as Layer 1/Layer 2 (L1/L2) control information (L1/L2 control signal), L1 control information (L1 control signal), and the like. In addition, the RRC signaling may be referred to as an RRC message, and may be, for example, an RRC connection setup message, an RRC connection reconfiguration message, and the like. In addition, notification of the MAC signaling may be performed using, for example, an MAC control element (CE).

Additionally, reporting of given information (for example, reporting of information to the effect that "X holds") does not necessarily have to be sent explicitly, and can be sent implicitly (for example, by not reporting this piece of given information, by reporting another piece of information, and so on).

Judgments may be made in values represented by one bit (0 or 1), may be made in Boolean values that represent true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Furthermore, software, commands, information and so on may be transmitted and received via transmission media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology and the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station and the base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be referred to as a transmitting apparatus, a receiving apparatus, a radio communication apparatus, and the like. It is noted that at least one of the base station and the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. It is noted that at least one of the base station and the mobile station also includes an apparatus that does not necessarily move during a communication operation. For example, at least one of the base station and the mobile station may be an Internet of Things (IoT) device such as a sensor.

In addition, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. In addition, terms such as "uplink" and "downlink" may be interpreted as a term corresponding to communication between terminals (for example, "side"). For example, an uplink channel, a downlink channel, and the like may be replaced with a side channel.

Similarly, the user terminal in the present disclosure may be replaced with a base station. In this case, the base station 10 may have the functions of the user terminal 20 described above.

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. In addition, the order of processing procedures, sequences, flowcharts, and the like of the aspects/embodiments described in the present disclosure may be re-ordered as long as there is no inconsistency. For example, the methods described in the present disclosure have presented various step elements using an exemplary order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. In addition, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

All references to the elements using designations such as "first" and "second" as used in the present disclosure do not generally limit the amount or sequence of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be regarded as "determining" judging, calculating, computing, processing, deriving, investigating, looking up (or searching or inquiring) (for example, looking up in a table, database, or another data structure), ascertaining, and the like.

Furthermore, "judging (deciding)" as used herein may be interpreted to mean making judgements (decisions) related to receiving (for example, receiving information), transmitting (for example, transmitting information), inputting, outputting, accessing (for example, accessing data in a memory) and so on.

In addition, "judging (deciding)" as used herein may be interpreted to mean making judgements (decisions) related to resolving, selecting, choosing, establishing, comparing and so on. In other words, to "judging (deciding)" as used herein may be interpreted to mean making judgements (decisions) related to some action.

In addition, "judging (deciding)" may be replaced with "assuming", "expecting", "considering", or the like.

The "maximum transmission power" described in the present disclosure may mean a maximum value of transmission power, nominal UE maximum transmit power, or rated UE maximum transmit power.

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the terms "A and B are different" may mean "A and B are different from each other". It is noted that the phrase may mean that "A and B are different from C". The terms such as "separate", "coupled", and the like may be interpreted similarly to "different".

When "include", "including", and variations of these are used in the present disclosure, these terms are intended to be inclusive similarly to the term "comprising". Moreover, the term "or" used in the present disclosure is intended to be not an exclusive-OR.

In the present disclosure, when articles are added by translation, for example, as a, an, and the in English, the present disclosure may include that nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined based on the description of claims. Thus, the description of the present disclosure is for the purpose of explaining examples and does not bring any limiting meaning to the invention according to the present disclosure.

What is claimed is:

1. A terminal comprising:
- a receiver that receives downlink control information (DCI) indicating a transmission configuration indication (TCI) state applicable to downlink and uplink;
- a processor that applies the TCI state from timing after ACK transmission corresponding to a reception of a physical downlink shared channel (PDSCH) scheduled by the DCI,
- wherein the receiver further receives a list including a plurality of TCI states applicable to downlink and uplink, and receives a medium access control-control element (MAC CE) activating one or more TCI states, including the TCI state, in the list; and
- a transmitter that transmits capability information indicating a maximum number of the one or more TCI states that are activated,
- wherein the processor controls to transmit a physical uplink control channel (PUCCH) including the ACK corresponding to the reception of the PDSCH, using another TCI state indicated prior to the TCI state indicated by the DCI that schedules the PDSCH, and
- the processor does not apply the TCI state to control resource set (CORESET) 0.

2. A radio communication method for a terminal, comprising:
- receiving downlink control information (DCI) indicating a transmission configuration indication (TCI) state applicable to downlink and uplink;
- applying the TCI state from timing after ACK transmission corresponding to a reception of a physical downlink shared channel (PDSCH) scheduled by the DCI;
- receiving a list including a plurality of TCI states applicable to downlink and uplink, and receiving a medium access control-control element (MAC CE) activating one or more TCI states, including the TCI state, in the list;
- transmitting capability information indicating a maximum number of the one or more TCI states that are activated; and
- controlling to transmit a physical uplink control channel (PUCCH) including the ACK corresponding to the reception of the PDSCH, using another TCI state indicated prior to the TCI state indicated by the DCI that schedules the PDSCH,
- wherein the applying does not apply the TCI state to control resource set (CORESET) 0.

3. A base station comprising:
- a transmitter that transmits downlink control information (DCI) indicating a transmission configuration indication (TCI) state applicable to downlink and uplink;
- a processor that performs a control, by transmitting the DCI, so that a terminal applies the TCI state from timing after a transmission of ACK corresponding to a physical downlink shared channel (PDSCH) scheduled by the DCI,
- wherein the transmitter further transmits a list including a plurality of TCI states applicable to downlink and uplink, and transmits a medium access control-control element (MAC CE) activating one or more TCI states, including the TCI state, in the list; and
- a receiver that receives capability information indicating a maximum number of the one or more TCI states that are activated,
- wherein the processor controls to receive a physical uplink control channel (PUCCH) including the ACK corresponding to reception of the PDSCH at the terminal, transmitted by the terminal using another TCI state indicated prior to the TCI state indicated by the DCI that schedules the PDSCH, and
- the TCI state is not applied to control resource set (CORESET) 0.

4. A system comprising a terminal and a base station, wherein
- the terminal comprises:
  - a receiver that receives downlink control information (DCI) indicating a transmission configuration indication (TCI) state applicable to downlink and uplink;
  - a processor that applies the TCI state from timing after ACK transmission corresponding to a reception of a physical downlink shared channel (PDSCH) scheduled by the DCI,
  - wherein the receiver further receives a list including a plurality of TCI states applicable to downlink and uplink, and receives a medium access control-control element (MAC CE) activating one or more TCI states, including the TCI state, in the list; and
  - a transmitter that transmits capability information indicating a maximum number of the one or more TCI states that are activated,
  - wherein the processor controls to transmit a physical uplink control channel (PUCCH) including the ACK corresponding to the reception of the PDSCH, using another TCI state indicated prior to the TCI state indicated by the DCI that schedules the PDSCH, and
  - the processor does not apply the TCI state to control resource set (CORESET) 0, and
- the base station comprises:
  - a transmitter that transmits the DCI.

* * * * *